US010926415B2

(12) United States Patent
Hashimoto et al.

(10) Patent No.: US 10,926,415 B2
(45) Date of Patent: Feb. 23, 2021

(54) ROBOT SYSTEM AND CONTROL METHOD OF ROBOT SYSTEM

(71) Applicant: KAWASAKI JUKOGYO KABUSHIKI KAISHA, Kobe (JP)

(72) Inventors: Yasuhiko Hashimoto, Kobe (JP); Shuhei Kuraoka, Akashi (JP); Shogo Hasegawa, Kakogawa (JP); Satoru Hibino, Kobe (JP); Hideshi Yamane, Kakogawa (JP); Hiroyuki Mizumoto, Kobe (JP); Kenji Bando, Nishinomiya (JP); Daichi Himekawa, Nishinomiya (JP); Junichi Matsuoka, Kobe (JP); Tatsuhiro Uto, Akashi (JP); Hiroki Kokushi, Kakogawa (JP); Souichi Tamada, Akashi (JP); Akihiro Haneda, Kakogawa (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 371 days.

(21) Appl. No.: 15/776,644

(22) PCT Filed: Nov. 16, 2016

(86) PCT No.: PCT/JP2016/004904
§ 371 (c)(1),
(2) Date: May 16, 2018

(87) PCT Pub. No.: WO2017/085932
PCT Pub. Date: May 26, 2017

(65) Prior Publication Data
US 2018/0339412 A1 Nov. 29, 2018

Related U.S. Application Data

(60) Provisional application No. 62/255,902, filed on Nov. 16, 2015.

(30) Foreign Application Priority Data

Aug. 12, 2016 (JP) .............................. JP2016-159002

(51) Int. Cl.
*B25J 13/08* (2006.01)
*B25J 15/06* (2006.01)
*B25J 9/16* (2006.01)

(52) U.S. Cl.
CPC ............. *B25J 9/1697* (2013.01); *B25J 13/08* (2013.01); *B25J 15/06* (2013.01)

(58) Field of Classification Search
CPC ........ B25J 15/0616; B25J 15/06; B25J 9/043; B25J 13/08; B25J 9/1697; G06F 40/10; B41J 1/00; G06T 11/60
See application file for complete search history.

(56) References Cited

U.S. PATENT DOCUMENTS 6,467,895 B1 * 10/2002 Burns .................. B65H 3/0816
347/101
7,194,144 B1 * 3/2007 Sakai ...................... G06T 11/60
382/284

(Continued)

FOREIGN PATENT DOCUMENTS

JP 2013-151045 A 8/2013

*Primary Examiner* — Stephen Holwerda
(74) *Attorney, Agent, or Firm* — Oliff PLC

(57) ABSTRACT

A robot system including a plurality of manipulation parts used to input a command of the specified character information, configured to send the input command of the specified character information to an information processing device, including a manipulation tool unit capable of manipulating the plurality of manipulation parts of the character input device; a robot arm unit capable of holding and moving the manipulation tool unit; an imaging device; a controller including: an imaging device control section to take an image of the paper document; a character string (Continued)

determiner section to determine an input target of the paper document; a manipulation part position determiner section corresponding to the character string; and a robot control section controlling the arm unit so the manipulation tool unit held by the arm unit moves while manipulating the manipulation part determined by the character string determiner section in an arrangement order of the character string.

14 Claims, 18 Drawing Sheets

(56) References Cited

U.S. PATENT DOCUMENTS

| | | | | |
|---|---|---|---|---|
| 2007/0205751 | A1* | 9/2007 | Suzuki | H04M 1/24 |
| | | | | 324/756.01 |
| 2009/0312009 | A1* | 12/2009 | Fishel | H01Q 1/241 |
| | | | | 455/425 |
| 2011/0251719 | A1* | 10/2011 | Lien | G06F 11/26 |
| | | | | 700/245 |
| 2014/0027067 | A1* | 1/2014 | Yuhara | B32B 37/0046 |
| | | | | 156/580 |

* cited by examiner

ROBOT SYSTEM AND CONTROL METHOD OF ROBOT SYSTEM

TECHNICAL FIELD

The present invention relates to a robot system and a control method of the robot system.

BACKGROUND ART

Conventionally, an information processing device is known, which includes a robot configured to perform predetermined processing based on an image taken by an imaging unit (e.g., see Patent Literature 1).

This information processing device includes the robot, the imaging unit which takes an image of a region that is in the vicinity of the robot, a recognizing section which recognizes characters contained in the image, a detecting section which detects particular notification target characters, from the characters recognized by the recognizing section, and a notifying section which notifies that the notification target characters have been detected by the operation of the robot. This allows a user to be notified of information corresponding to the notification target characters.

CITATION LIST

Patent Literature

Patent Literature 1: Japanese-Laid Open Patent Application Publication No. 2013-151045

SUMMARY OF INVENTION

Technical Problem

In a case where a robot system is used in a work operation for inputting character information written in a paper document, for example, the information processing device disclosed in Patent Literature 1 merely recognizes the characters and notifies the operator of information corresponding to the recognized characters. The information processing device is unable to perform a series of work operations of the operator, including recognizing character strings written in the paper document and inputting the character strings.

Solution to Problem

To solve the above-described problem, according to the present invention, there is provided a robot system configured to manipulate a character input device to perform a work operation for inputting specified character information written in a paper document, the character input device being located at a predetermined position, including a plurality of manipulation parts used to input a command of the specified character information, and being configured to send the input command of the specified character information to an information processing device, the robot system comprising: a manipulation tool unit capable of manipulating each of the plurality of manipulation parts of the character input device; a robot including a robot arm unit which is capable of holding the manipulation tool unit and is configured to move the manipulation tool unit in a state in which the manipulation tool unit is held by the robot arm unit; an imaging device; and a controller including: an imaging device control section which controls the imaging device to take an image of the paper document; a character string determiner section which determines a character string as an input target of the paper document which is contained in image data obtained by the imaging device; a manipulation part position determiner section which determines a position of the manipulation part corresponding to each character of the character string determined by the character string determiner section; and a robot control section which controls the robot arm unit so that the manipulation tool unit held by the robot arm unit moves while manipulating the manipulation part determined by the character string determiner section in an arrangement order of characters of the character string, based on the position of the manipulation part corresponding to each character of the character string, which is determined by the manipulation part position determiner section.

In accordance with this configuration, the robot system is able to properly perform the work operation for inputting to the information processing device the character information written in the paper document by manipulating the character input device. In this way, the robot is able to perform the work operation for inputting to the information processing device the character information of the character strings written in the paper document, by manipulating the character input device, in place of a desk worker. In a case where the robot performs the work operation for inputting the character information, in place of the desk worker, it is not necessary to change the configuration of the information processing device, and the robot system can be introduced smoothly and quickly.

The controller may further comprise: a path calculation section which calculates an operation path on which the robot arm unit operates so that the manipulation tool unit held by the robot arm unit moves while manipulating the manipulation part determined by the character string determiner section in the arrangement order of the characters of the character string, based on the position of the manipulation part corresponding to each character of the character string, which is determined by the manipulation part position determiner section, and the robot control section may be configured to control the robot arm unit based on the operation path.

In accordance with this configuration, the work operation for inputting the character information can be performed more properly by use of the robot system.

The manipulation tool unit may include a first manipulation tool and a second manipulation tool, the robot arm unit may include a first robot arm which is capable of holding the first manipulation tool and is configured to move the first manipulation tool in a state in which the first manipulation tool is held by the first robot arm, and a second robot arm which is capable of holding the second manipulation tool and is configured to move the second manipulation tool in a state in which the second manipulation tool is held by the second robot arm, and the path calculation section may calculate a first operation path on which the first robot arm operates and a second operation path on which the second robot arm operates so that the first manipulation tool held by the first robot arm and the second manipulation tool held by the second robot arm move while manipulating the manipulation part determined by the character string determiner section in the arrangement order of the characters of the character string.

In accordance with this configuration, the work operation for inputting the character information can be performed quickly.

The robot system may further comprise a suction unit including a first suction tool and a second suction tool, each of the first suction tool and the second suction tool being configured to suction an upper surface of the paper document, the controller may further include a suction unit control section which controls an operation of the suction unit for suctioning the paper document and an operation of the suction unit for releasing the paper document, the first robot arm may be capable of holding the first suction tool and may be configured to move the first suction tool held by the first robot arm, and the second robot arm may be capable of holding the second suction tool and may be configured to move the second suction tool held by the second robot arm.

In accordance with this configuration, the paper document can be properly moved in a case where the work operation for inputting the character information is performed.

The robot control section may be configured to control the first robot arm to locate the first suction tool at a first position where the first suction tool contacts an upper surface of a region which is in the vicinity of one of a pair of opposite side edges of the paper document, and the suction unit control section may be configured to control the suction unit to cause the first suction tool to suction the paper document, the robot control section may be configured to control the second robot arm to locate the second suction tool at a second position where the second suction tool contacts an upper surface of a region which is in the vicinity of the other of the pair of opposite side edges of the paper document, the suction unit control section may be configured to control the suction unit to cause the second suction tool to suction the paper document, and wherein the robot control section may be configured to control the second robot arm to move the second suction tool to a third position that is above the first suction tool in a normal line direction of an extending surface of the paper document, to then move the second suction tool back and forth between a fourth position that is between the second position and the third position, and the third position, and to control the first robot arm and the second robot arm to move the first suction tool and the second suction tool in a direction crossing the normal line direction of an upper surface of the paper document.

In accordance with this configuration, it becomes possible to separate from each other the paper document present at an upper most position and the paper document present immediately under the paper document present at an upper most position, of the paper documents piled up, these paper documents adhering to each other by an influence of static electricity.

The information processing device may include a display device including a display screen which displays the character information having been input by the character input device, the imaging device control section may be configured to control the imaging device to take an image of the display screen, the character string determiner section may be configured to determine an input character string corresponding to the character string having been input by the character input device and contained in the image data of the display screen having been obtained by the imaging device, and the controller may further include an input error determiner section which determines whether or not the character string as the input target contained in the image data of the paper document matches the input character string having been input by the character input device and contained in the image data of the display screen.

In accordance with this configuration, the input error can be detected.

The character input device may be a hardware keyboard, the manipulation part may be a key of the hardware keyboard, and the robot control section may be configured to control the robot arm unit so that the manipulation tool unit moves while pushing down the key.

In accordance with this configuration, it becomes possible for the robot system to perform the work operation for inputting to the information processing device the character information written in the paper document by manipulating the hardware keyboard.

A lower surface of the manipulation tool unit may be curved to protrude in a downward direction and constitutes a contact element which contacts the key.

In accordance with this configuration, the manipulation tool unit can contact the key in a limited region. As a result, the input error can be prevented.

The manipulation tool unit may include a float mechanism including an up-down element which is movable between a lower limit position and an upper limit position and has a lower surface configured to contact the key.

In accordance with this configuration, the float mechanism can absorb a position error associated with the push-down operation, and the configuration of the robot system can be simplified.

The float mechanism may include an elastic element which biases the up-down element in a direction from the upper limit position toward the lower limit position.

In accordance with this configuration, the key of the keyboard can be pushed down more reliably.

The character input device may be an electromagnetic induction touch panel display input device including a display screen which displays a software keyboard including a plurality of key images, the manipulation part may be a region corresponding to each of the plurality of key images, and the manipulation tool unit may include a magnetic field generating element for generating a magnetic field used to identify a position at which the manipulation tool unit contacts the display screen of the character input device.

In accordance with this configuration, by manipulating the software keyboard displayed on the display screen of the electromagnetic induction touch panel display input device, the robot system can properly perform the work operation for inputting to the information processing device the character information written in the paper document.

The character input device may be an electrostatic capacitance touch panel display input device including a display screen which displays a software keyboard including a plurality of key images, the manipulation part may be a region corresponding to each of the plurality of key images, and the manipulation tool unit may include an electrostatic charge element for generating static electricity used to identify a position at which the manipulation tool unit contacts the display screen of the character input device.

In accordance with this configuration, by manipulating the software keyboard displayed on the display screen of the electrostatic capacitance touch panel display input device, the robot system can properly perform the work operation for inputting to the information processing device the character information written in the paper document.

The robot system may further include a notification section which notifies that a cumulative number of the number of times the manipulation tool unit has manipulated the manipulation part has exceeded an upper limit value of the number of times which is permitted as an upper limit value of the cumulative number of the number of times the manipulation tool unit has manipulated the manipulation part, and the controller may further include a notification section control section which determines whether or not the cumulative number has exceeded the upper limit value, and controls the notification section to notify that the cumulative number has exceeded the upper limit value, in a case where the notification section control section determines that the cumulative number has exceeded the upper limit value.

In accordance with this configuration, an operator can be notified that parts should be changed.

To solve the above-described problem, according to the present invention, there is provided a method of controlling a robot system configured to manipulate a character input device to perform a work operation for inputting specified character information written in a paper document, the character input device being located at a predetermined position, including a plurality of manipulation parts used to input a command of the specified character information, and being configured to send the input command of the specified character information to an information processing device, the robot system comprising: a manipulation tool unit capable of manipulating each of the plurality of manipulation parts of the character input device; a robot including a robot arm unit which is capable of holding the manipulation tool unit and is configured to move the manipulation tool unit in a state in which the manipulation tool unit is held by the robot arm unit; an imaging device; and a controller which controls the robot arm unit and the imaging device, the method comprising controlling by the controller the imaging device to take an image of the paper document; determining by the controller a character string as an input target of the paper document contained in image data obtained by the imaging device; determining by the controller a position of the manipulation part corresponding to each character of the character string determined by the character string determiner section; and controlling by the controller the robot arm unit so that the manipulation tool unit held by the robot arm unit moves while manipulating the manipulation part determined by the character string determiner section in an arrangement order of characters of the character string, based on the position of the manipulation part corresponding to each character of the character string, which is determined by the manipulation part position determiner section.

In accordance with this method, the robot system is able to properly perform the work operation for inputting to the information processing device the character information written in the paper document by manipulating the character input device. In this way, the robot is able to perform the work operation for inputting to the information processing device the character information of the character strings written in the paper document, by manipulating the character input device, in place of the desk worker. In a case where the robot performs the work operation for inputting the character information, in place of the desk worker, it is not necessary to change the configuration of the information processing device, and the robot system can be introduced smoothly and quickly.

Advantageous Effects of Invention

The present invention can obtain advantages in that a robot is able to properly perform a work operation for inputting character information written in a paper document to an information processing device including a keyboard, by manipulating the keyboard.

DESCRIPTION OF EMBODIMENTS

Now, the embodiments of the present invention will be described with reference to the drawings. Note that the present invention is not limited to the embodiments. Hereinafter, throughout the drawings, the same or corresponding constituents are designated by the same reference symbols and will not be described in repetition.

Embodiment 1

Figure 1:
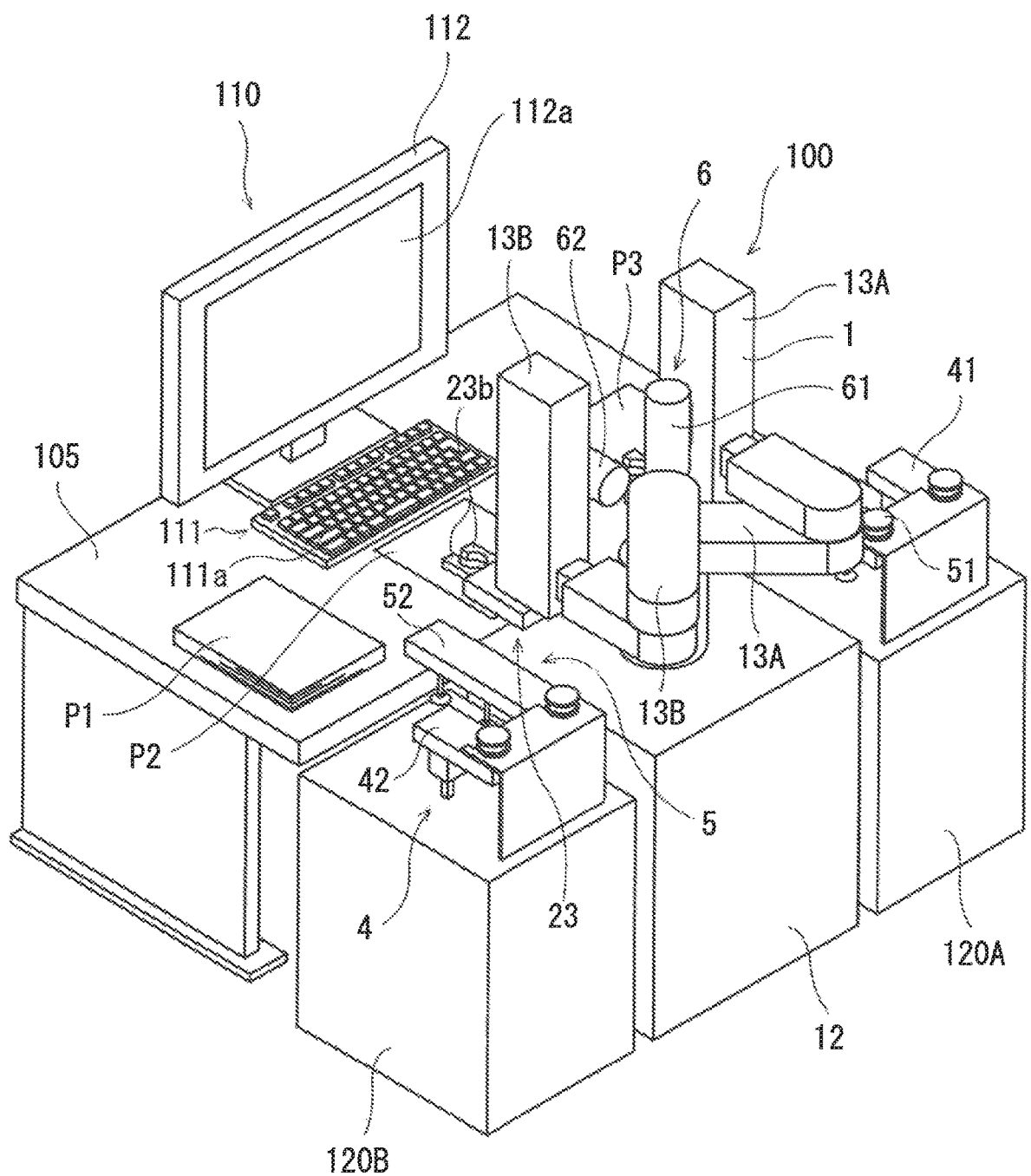
FIG. 1 is a perspective view showing an example of the configuration of a robot system according to Embodiment 1 of the present invention.

FIG. 1 is a perspective view showing an example of the configuration of a robot system 100 according to Embodiment 1 of the present invention. As shown in FIG. 1, the robot system 100 is a system configured to manipulate manipulation parts of a character input device of an information processing device 110 to perform a work operation for inputting character information written in paper documents. In the present embodiment, the character input device is a hardware keyboard 111 including a plurality of keys (manipulation parts) 111a used to input a command of specified character information. When the keyboard 111 detects that one of the keys 111a has been pushed (pressed) down, the keyboard 111 sends the input command of character information corresponding to the key 111a pushed down to the information processing device 110. In summary, the keyboard (character input device) 111 is a device used to input the command of the character information by an operator's manipulation for touching the keys (manipulation parts) 111a. The keyboard 111 is located at a predetermined position on a desk 105. The information processing device 110 includes a display device 112 including a display screen 112a for displaying the character information input by use of the keyboard 111, and a controller which is not shown, in addition to the keyboard 111. The robot system 100 is configured to manipulate the keyboard 111 to perform a work operation for inputting character information written in the paper document to the information processing device 110. The keyboard 111 is, for example, a keyboard with a key arrangement which is QWERTY arrangement.

Figure 2:
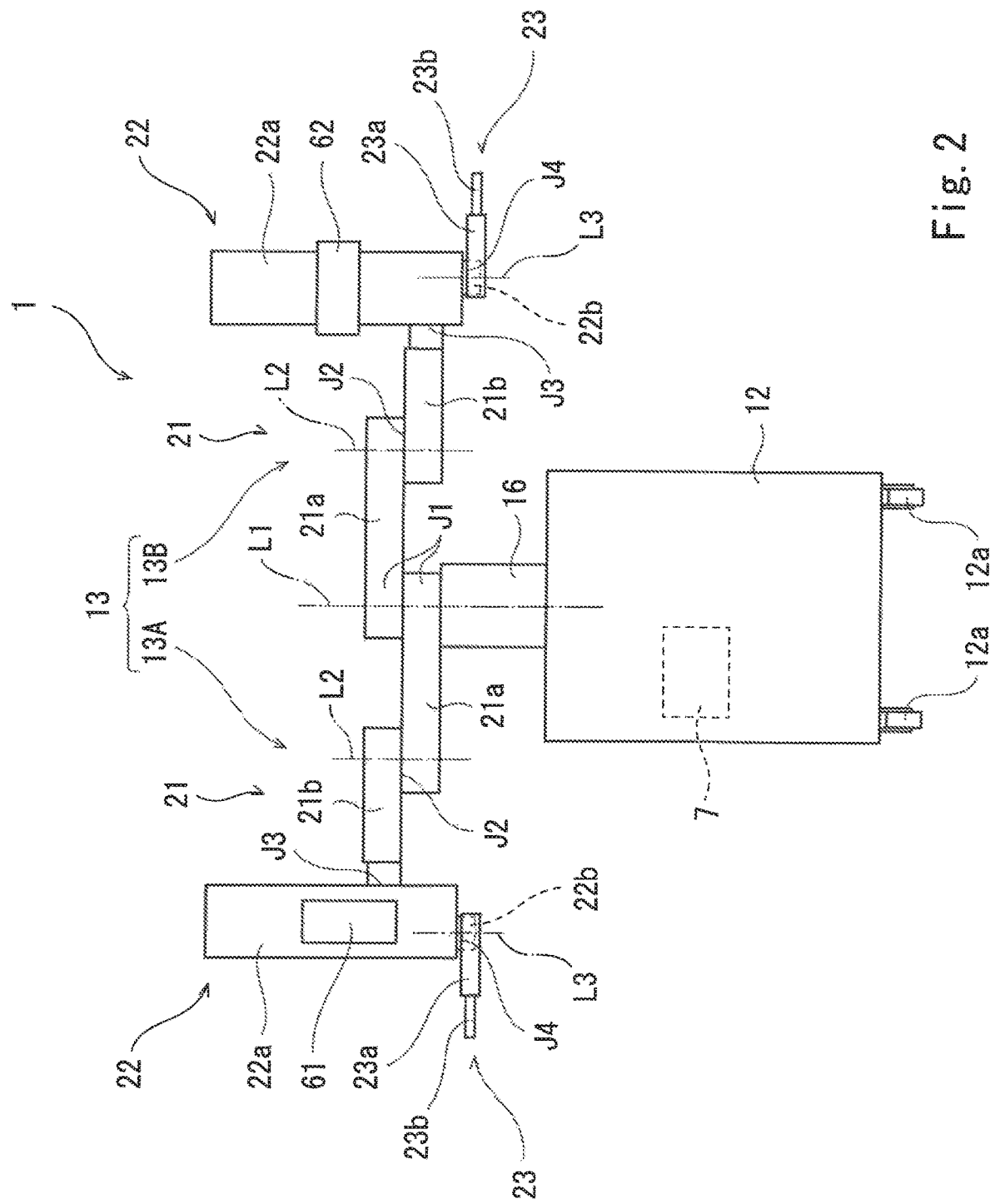
FIG. 2 is a front view showing an example of the configuration of a robot of the robot system of FIG. 1.

FIG. 2 is a front view showing an example of the configuration of the robot 1. FIG. 2 shows a state in which a robot arm unit 13 of the robot 1 is extended to a lateral side.

As shown in FIGS. 1 and 2, the robot system 100 includes the robot 1, a manipulation tool unit 4, a suction unit 5, an imaging device 6, and a controller 7.

The robot 1 is, for example, a horizontal multi joint (articulated) dual-arm robot including a robot arm unit 13 including a pair of robot arms (first robot arm 13A and second robot arm 13B). However, this is exemplary. The robot arm may be a vertical multi joint (articulated) robot arm.

The robot 1 includes a carrier 12, and the robot arm unit 13 supported on the carrier 12. Specifically, the first robot arm 13A and the second robot arm 13B are supported on the carrier 12.

The carrier 12 includes wheels 12a and is movable (able to travel). The carrier 12 includes a base shaft 16. The base shaft 16 is secured to the upper surface of the carrier 12. The controller 7 is accommodated inside the carrier 12. Therefore, the robot 1 can be easily moved.

The robot arm unit 13 is capable of holding the manipulation tool unit 4 and is configured to move the manipulation tool unit 4 within a predetermined operation (movement) range in a state in which the manipulation tool unit 4 is held by the robot arm unit 13. The robot arm unit 13 is capable of holding the suction unit 5 and is configured to move the suction unit 5 within a predetermined operation (movement) range in a state in which the suction unit 5 is held by the robot arm unit 13.

The robot arm unit 13 includes the first robot arm 13A and the second robot arm 13B.

The first robot arm 13A is capable of holding a first manipulation tool 41 of the manipulation tool unit 4 and is configured to move the first manipulation tool 41 within a predetermined operation (movement range) in a state in which the first manipulation tool 41 is held by the first robot arm 13A. The first robot arm 13A is capable of holding a first suction tool 51 of the suction unit 5 and is configured to move the first suction tool 51 within a predetermined operation (movement) range in a state in which the first suction tool 51 is held by the first robot arm 13A.

The first robot arm 13A is the horizontal multi-joint (articulated) robot arm as described above. The first robot arm 13A includes an arm part 21, a wrist part 22, a hand 23, and a robot arm driving section 24.

The arm part 21 is configured to locate the wrist part 22 and the hand 23 at positions within operation ranges. The arm part 21 includes a first link 21a extending horizontally and a second link 21b extending horizontally. The base end portion of the first link 21a is coupled to the base shaft 16 of the carrier 12 by a rotation joint J1. The first link 21a is rotatable around a rotational axis L1 extending through the center axis of the base shaft 16. The second link 21b is coupled to the tip end portion of the first link 21a by a rotation joint J2. The second link 21b is rotatable around a rotational axis L2 defined at the tip end portion of the first link 21a.

The wrist part 22 is configured to change a vertical position of the hand 23 attached to the tip end of the wrist part 22 and to change the posture of the hand 23 around a rotational axis L3. The wrist part 22 includes an up-down member 22a and a rotation member 22b.

The up-down member 22a is coupled to the tip end portion of the second link 21b by a linear-motion joint J3. The up-down member 22a is movable up and down with respect to the second link 21b. The rotation member 22b is coupled to the lower end portion of the up-down member 22a by a rotation joint J4. The rotation member 22b is rotatable around the rotational axis L3 defined at the lower end of the up-down member 22a. Since the robot 1 includes the up-down member 22a, the keys 111a of the keyboard 111 can be pushed down by operating the up-down member 22a.

In the present embodiment, the rotational axes L1 to L3 are parallel to each other and extend, for example, vertically. The direction in which the rotational axes L1 to L3 extend is parallel to the direction in which the up-down member 22a moves up and down.

The robot arm driving section 24 includes driving servo motors (not shown) corresponding to the joints J1 to J4, respectively, and encoders (not shown) which detect rotation angles of the servo motors, respectively. The rotational axis L1 of the first robot arm 13A and the rotational axis L1 of the second robot arm 13B are on the same straight line. The first link 21a of the first robot arm 13A and the first link 21a of the second robot arm 13B are disposed with a vertical level difference. This makes it possible to compactly configure the dual-arm robot arm unit 13. In addition, the configuration of the dual-arm robot arm unit 13 can be simplified.

The hand 23 is a mechanism attached on the wrist part 22 and configured to hold tools. In the present embodiment, the hand 23 is configured to hold the manipulation tool unit 4 and the suction unit 5. The hand 23 includes a base member 23a having a base end portion attached on the wrist part 22, a pair of holding elements 23b (see FIG. 1) extending horizontally from the tip end portion of the base member 23a, and an open/close driving mechanism (not shown) which moves the pair of holding elements 23b horizontally (open/close direction).

As shown in FIG. 1, the pair of holding elements 23b are disposed to face in a direction in which they are opened and closed. The pair of holding elements 23b have recesses (concave portions), respectively, in surfaces facing each other. The pair of holding elements 23b are configured to be closed to hold a holding target element (target element to be held) 43 which will be described later (see FIG. 3) of the manipulation tool unit 4 or a holding target element (target element to be held) 55 which will be described later (see FIG. 4) of the suction unit 5. The pair of holding elements 23b are configured to be opened to release the holding target element 43 of the manipulation tool unit 4 or the holding target element 55 of the suction unit 5. Therefore, the manipulation tool unit 4 or the suction unit 5 held by the hand 23 is placed continuously at the tip end of the robot arm unit 13.

The second robot arm 13B is capable of holding the second manipulation tool 42 of the manipulation tool unit 4 and is configured to move the second manipulation tool 42 within a predetermined movement range in a state in which the second manipulation tool 42 is held by the second robot arm 13B. The second robot arm 13B is capable of holding the second suction tool 52 of the suction unit 5 and is configured to move the second suction tool 52 in a state in which the second suction tool 52 is held by the second robot arm 13B. The other constituents of the second robot arm 13B are the same as those of the first robot arm 13A, and will not be described in detail.

As described above, the driving section of the first robot arm 13A and the driving section of the second robot arm 13B are provided independently of each other. The first robot arm 13A and the second robot arm 13B are operative independently of each other, and in association with each other.

Figure 3:
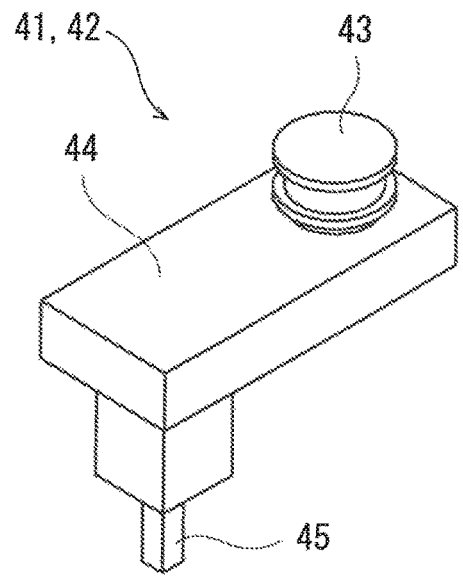
FIG. 3 is a perspective view showing an example of a first manipulation tool and a second manipulation tool of a manipulation tool unit of the robot system of FIG. 1.

FIG. 3 is a perspective view showing an example of the configuration of the first manipulation tool 41 and the second manipulation tool 42 of the manipulation tool unit 4.

The manipulation tool unit 4 is configured to be able to manipulate the key 111a of the keyboard 111. Specifically, the key push-down unit 4 is configured to be able to push down the key 111a of the keyboard 111.

The manipulation tool unit 4 includes the first manipulation tool 41 and the second manipulation tool 42.

As shown in FIG. 3, the first manipulation tool 41 is held by the hand 23 of the first robot arm 13A and configured to be able to push down the key 111a of the keyboard 111 as described above. The first manipulation tool 41 includes the holding target element 43, a base member 44, and a contact element 45.

In a state in which the pair of holding elements 23b of the handle 23 are closed, the holding target element 43 is engaged with the recesses of the pair of holding elements 23b. For example, the holding target element 43 has a cylindrical shape, and is formed with flanges protruding radially in an upper end portion and an intermediate portion thereof. A recessed portion of the holding target element 43 which is between the flanges is fittable to the recesses of the pair of holding elements 23b of the hand 23.

The base member 44 is a plate member extending in a direction crossing the rotational axis L3 of the up-down member 22a, in a state in which the first manipulation tool 41 is held by the hand 23. The base member 44 extends, for example, horizontally. The base end portion of the base member 44 is attached on the lower end portion of the holding target element 43.

The contact element 45 is a column-shaped element extending downward from the tip end portion of the base member 44. A surface of the tip end portion of the contact element 45 is smaller than the upper surface of the key 111a of the keyboard 111. The contact element 45 is configured to be able to push down a desired key 111a of the keyboard 111. The contact element 45 is made of, for example, elastic material. This makes it possible to mitigate an impact generated when the contact element 45 contacts and pushes down the key 111a of the keyboard 111.

As described above, the second manipulation tool 42 is held by the hand 23 of the second robot arm 13B. The other constituents of the second manipulation tool 42 are similar to those of the first manipulation tool 41 and will not be described in detail.

Figure 4:
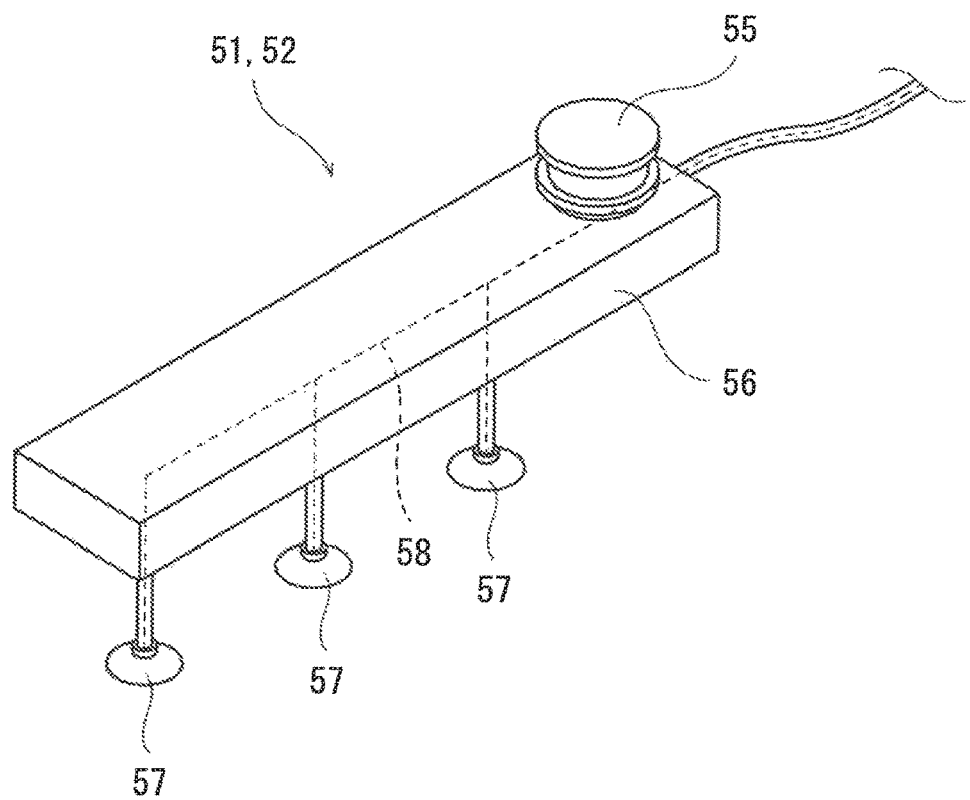
FIG. 4 is a perspective view showing an example of the configuration of a first suction tool and the configuration of a second suction tool of a suction unit of the robot system of FIG. 1.

FIG. 4 is a perspective view showing an example of the configuration of the first suction tool 51 and the configuration of the second suction tool 52 of the suction unit 5.

The suction unit 5 is configured to be able to suction a sheet of the paper document. The suction unit 5 includes the first suction tool 51, the second suction tool 52, and a vacuum device (not shown).

As shown in FIG. 4 as described above, the first suction tool 51 is held by the hand 23 of the first robot arm 13A and configured to be able to suction the upper surface (paper surface) of the paper document. The first suction tool 51 includes the holding target element 55, a base member 56, one or more suction pads 57, and a pipe 58.

The holding target element 55 is configured as in the holding target element 43 of the first manipulation tool 41. Since the holding target element 43 of the manipulation tool unit 4 and the holding target element 55 of the suction unit 5 are the same member (interchangeable), the hand 23 can hold various tools and be attached with the tools.

The base member 56 is a plate member extending in a direction crossing the rotational axis L3 of the up-down member 22a in a state in which the first suction tool 51 is held by the hand 23. The base member 56 extends, for example, horizontally. The base end portion of the base member 56 is mounted on the lower end portion of the holding target element 55.

As the suction pads 57, for example, three suction pads are provided and aligned in the extending direction of the base member 56. Each of the suction pads 57 includes a support column extending downward from the lower surface of the base member 56, and a pad provided at the lower end portion of the support column. The pad has a tapered shape in which it expands in a radial direction of the support column as it extends in a downward direction. The pad is made of an elastic material such as a resin.

The pipe 58 is disposed so that an inner space formed between the pad of each of the suction pads 57 and the paper surface is connected to the vacuum device in a state in which the lower end edges of the pads of the suction pads 57 are in contact with the paper surface of the paper document. The pipe 58 is provided with, for example, an on-off valve (not shown). This on-off valve opens and closes the pipe 58.

The second suction tool 52 is held by the hand 23 of the second robot arm 13B as described above, and configured to suction the upper surface of the paper document. The other constituents of the second suction tool 52 are the same as those of the first suction tool 51, and will not be described in detail.

The vacuum device is, for example, a vacuum pump, or CONVUM (registered mark). The vacuum device is disposed in the vicinity of the robot 1. This is exemplary. Alternatively, for example, the vacuum device may be provided inside the base member 56, or inside the carrier 12 of the robot 1. The vacuum device and the on-off valve of the pipe 58 are electrically or communicatively connected to the controller 7. The controller 7 controls the operation of the vacuum device and the operation of the on-off valve of the pipe 58.

In the example of the present embodiment, as shown in FIG. 1, the first manipulation tool 41 and the first suction tool 51 are placed on a first tool table 120A disposed on a lateral side of the first robot arm 13A, in an initial state. The hand 23 of the first robot arm 13A picks up the tool (the first manipulation tool 41 or the first suction tool 51) corresponding to the purpose of the work operation from the first tool table 120A. The tool is configured to perform the work operation. The second manipulation tool 42 and the second suction tool 52 are placed on a second tool table 120B disposed on a lateral side of the second robot arm 13B, in an initial state. The hand 23 of the second robot arm 13B picks up the tool (the second manipulation tool 42 or the second suction tool 52) corresponding to the purpose of the work operation from the second tool table 120B. The tool performs the work operation. The position of each of the tool tables are not limited to the above and may be a desired position within an operation range of the robot arm corresponding to the tool.

The imaging device 6 is, for example, a camera including an image sensor. The imaging device 6 is able to take an image of a target space to which the image sensor is directed. The imaging device 6 is electrically or communicatively connected to the controller 6, and sends information of the image to the controller 7 (see FIG. 2).

The imaging device 6 includes a first camera 61 and a second camera 62. The first camera 61 is attached on the first robot arm 13A and faces in a downward direction. In the present embodiment, the first camera 61 is a camera which takes an image of the paper surface of the paper document placed on the desk 105. The second camera 62 is attached on the second robot arm 13B and faces in a lateral direction. In the present embodiment, the second camera 62 is a camera which takes an image of the display screen 112a of the display device 112 placed on the desk 105. Thus, by operating the first robot arm 13A and the second robot arm 13B, the first camera 61 and the second camera 62 can be moved independently of each other. Since the camera which takes an image of the paper surface of the paper document placed on the desk 105 is separate from the camera which takes an image of the display screen 112a of the display device 112 placed on the desk 105, a series of work operations for inputting characters can be quickly carried out.

Although in the present embodiment, the imaging device 62 includes two cameras, the configuration of the imaging device 62 is not limited to this, and the imaging device 62 may include one camera. In addition, the position of the first camera 61 and the position of the second camera 62 are not limited to the above so long as the first camera 61 and the second camera 62 are secured to desired positions, respectively, at which they can take an image of the paper document on the desk 105 and the display screen 112a of the display device 112 on the desk 105.

[Example of Configuration of Controller]

Figure 5:
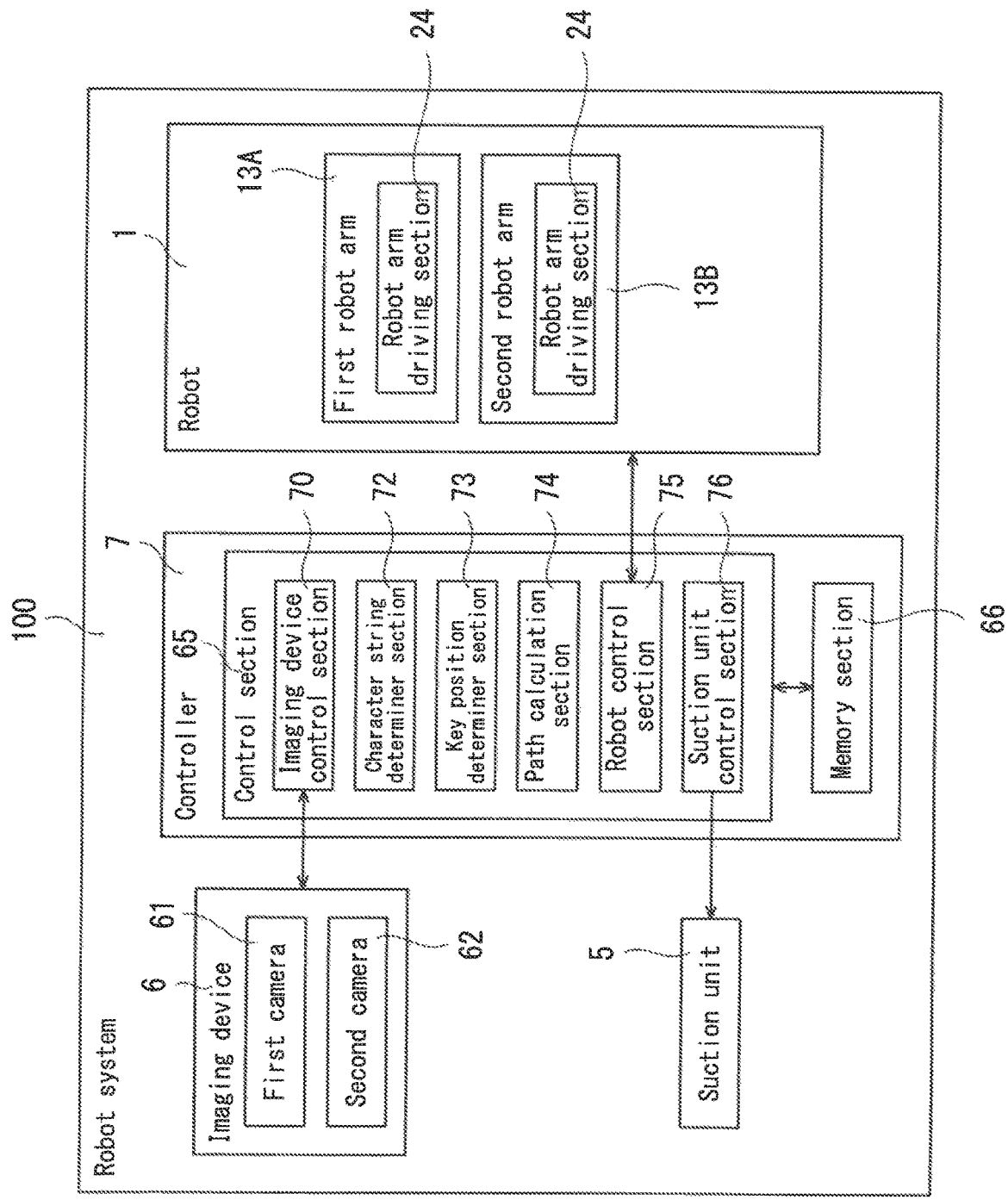
FIG. 5 is a block diagram showing an example of the configuration of a control system of the robot system of FIG. 1.

FIG. 5 is a block diagram showing an example of the configuration of a control system of the robot system 100 of FIG. 1.

As shown in FIG. 5, the controller 7 includes a control section 65 and a memory section 66. The controller 7 may include a single controller which performs a centralized control, or a plurality of controllers which perform a distributed control.

The control section 65 is constituted by a processor such as a microcontroller, a CPU, a MPU, a logic circuit, and a PLC. The control section 65 includes an imaging device control section 70, a character string determiner section 72, a key position determiner section (manipulation part position determiner section) 73, a path calculation section 74, a robot control section 75, a suction unit control section 76, and an input error determiner section 77. The imaging device control section 70, the character string determiner section 72, the key position determiner section 73, the path calculation section 74, the robot control section 75, the suction unit control section 76, and the input error determiner section 77 are functional blocks performed in such a manner that the control section 65 executes predetermined control programs stored in the memory section 66.

The imaging device control section 70 is configured to cause the first camera 61 of the imaging device 6 to take an image of the paper document to obtain image data (imaging data) of the paper document. The imaging device control section 70 is configured to control the second camera 62 of the imaging device 6 to take an image of the display screen 112a of the display device 112, to obtain image data of the display screen 112a.

The character string determiner section 72 is configured to determine the character string which is an input target of the paper document, and is contained in the image data obtained by the first camera 61 of the imaging device 6. The character string determiner section 72 is configured to determine the character string having been input to the information processing device 110 by the keyboard 111, and is contained in the image data of the display screen 112a of the display device 112, which has been obtained by the second camera 62 of the imaging device 6.

The key position determiner section 73 is configured to determine the position of the key (manipulation part) 111a corresponding to each character of the input target character string determined by the character string determiner section 72. More specifically, the key position determiner section 73 is configured to determine the position of the key 111a corresponding to each character of the character string determined by the character string determiner section 72, based on position information of each key 111a of the keyboard 111 which is preset and stored in the memory section 66.

The path calculation section 74 is configured to calculate an operation path (movement path) on which the robot arm unit 13 operates so that the manipulation tool unit 4 held by the robot arm unit 13 moves while pushing down the key 111a determined by the character string determiner section 72 in the arrangement order of the characters of the character string, based on the position of the key 111a corresponding to each character of the character string as the input target, which has been determined by the key position determiner section 73.

In the present embodiment in which the robot 1 is the dual-arm robot, the path calculation section 74 calculates a first operation path on which the first robot arm 13A operates and a second operation path on which the second robot arm 13B operates so that the first manipulation tool 41 held by the first robot arm 13A and the second manipulation tool 42 held by the second robot arm 13B move while pushing down the key 111a determined by the character string determiner section 72 in the arrangement order of the characters of the character string.

Figure 7:
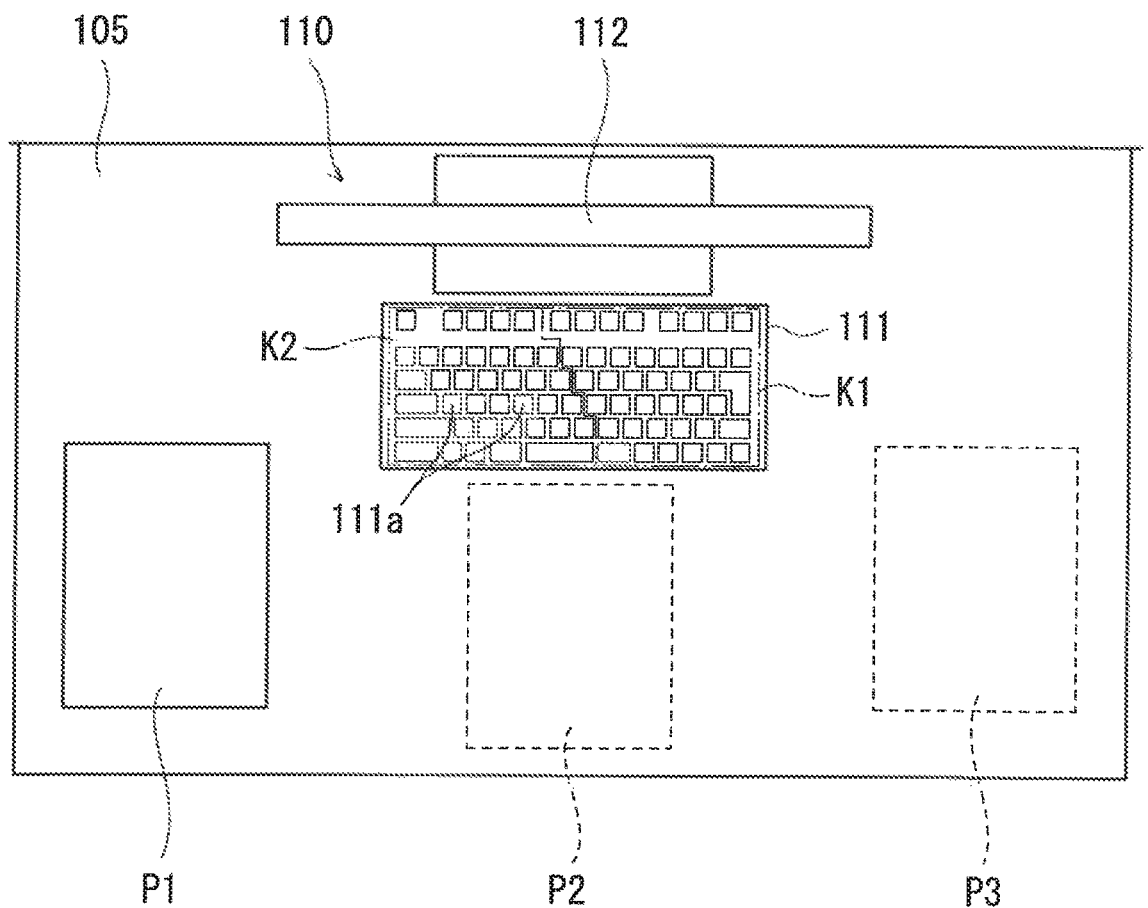
FIG. 7 is a plan view showing an example of the configuration of a region on a desk where the robot system of FIG. 1 performs a work operation for inputting character information.

For example, in a case where a region where the keys 111a of the keyboard 111 are provided is virtually divided into two regions (right and left regions) K1 and K2, as shown in FIG. 7, the first operation path is a path on which the first robot arm 13A operates so that the first manipulation tool 41 moves while pushing down each key 111a included in the region K1 on a side where the first robot arm 13A is located relative to the base shaft 16. In contrast, the second operation path is a path on which the second robot arm 13B operates so that the second manipulation tool 42 moves while pushing down each key 111a included in the region K2 on a side where the second robot arm 13B is located relative to the base shaft 16.

The robot control section 75 is configured to control the robot arm unit 13 so that the manipulation tool unit 4 held by the robot arm unit 13 moves while pushing down the key 111a determined by the character string determiner section 72, in the arrangement order of the characters of the character string based on the position of the key 111a corresponding to each character of the character string determined by the key position determiner section 73. In brief, the robot control section 75 controls the first robot arm 13A based on the first operation path calculated by the path calculation section 74 and controls the second robot arm 13B based on the second operation path calculated by the path calculation section 74. For example, the robot control section 75 is configured to control the robot 1 via servo amplifiers (not shown) for controlling driving servo motors corresponding to the joints J1 to J4, respectively, of each robot arm.

The suction unit control section 76 controls the suction unit 5's operations for suctioning and releasing the paper document. Specifically, the suction unit control section 76 is configured to control the operation of the vacuum device and opening and closing of the on-off valve of the pipe 58, to control the operations for suctioning and releasing the paper document.

The input error determiner section 77 is configured to determine whether or not the input target character string contained in the image data of the paper document matches the input character string having been input by the keyboard 111 and contained in the image data of the display screen 112a.

The memory section 66 includes memories such as ROM and RAM. The memory section 66 contains therein specified programs. The control section 65 reads and executes the programs. In this way, processing is performed. The memory section 66 also contains therein the position information of each key 111a of the keyboard 111, information of the regions K1 and K2 of the keyboard 111, and position information of a place P1 where a paper document for which processing is to be performed is placed, a place P2 where a paper document for which the processing is being performed is placed, and a place P3 where a paper document for which the processing has been performed (the processing is completed) is placed (the places P1 to P3 will be described later).

[Example of Operation]

Next, an example of the operation of the robot system 100 will be described.

FIGS. 6A, 6B, 6C, and 6D are flowcharts showing an example of the operation of the robot system 100. FIG. 7 is a plan view showing an example of the configuration of a region on the desk 105 where the robot system 100 performs the work operation for inputting the character information.

The desk 105 is, for example, a well-known clerical desk. For example, the operator places a chair on the front side of the desk 105 (e.g., in FIG. 7, under the desk 105). The operator sees the display device 112 of the information processing device 110 and manipulates the information processing device 110 on the desk 105. The displace device 112 is placed on a far side on the desk 105 (in FIG. 7, upper position of the desk 105). The keyboard 111 is placed in front of the display device 112.

Figure 9:
FIG. 9 is a view showing an example of an image of a paper document which is taken by an imaging device of the robot system of FIG. 1.

In the present example of operation, the robot system 100 performs a work operation for inputting character information written in invoices (see FIG. 9). The invoices for which the processing is not performed yet are piled up on the place P1 where the paper document for which processing is to be performed is placed, which is defined on the deck 105 as shown in FIGS. 1 and 7. The invoice present at an uppermost position, of the invoices piled up on the place P1 is moved to the place P2 where the paper document for which the processing is being performed is placed, and in this state, the work operation for inputting the character information is performed. In the present example of operation, the robot system 100 is configured to input the character information written in item column of Parts Number written in the invoice, the character information written in item column of Quantity, the character information written in item column of Unit Price, and the character information written in item column of Amount. However, the input target is not limited to these. The document for which the work operation for inputting the character information is completed is moved to the place P3 and piled up. The place P1 is defined in, for example, a location which is in the vicinity of one of side edges of the desk 105. The place P3 is defined in, for example, a location which is in the vicinity of the other side edges of the desk 105. The place P2 is defined between the place P1 and the place P3. The positions of the place P1, the place P2, and the place P3 are not limited to the above. For example, in a case where the robot system 100 carries out the work operation in place of a desk worker who performs work on the desk 105, the positions of the place P1, the place P2, and the place P3 may be defined according to the layout used by this desk worker.

Figure 6A:
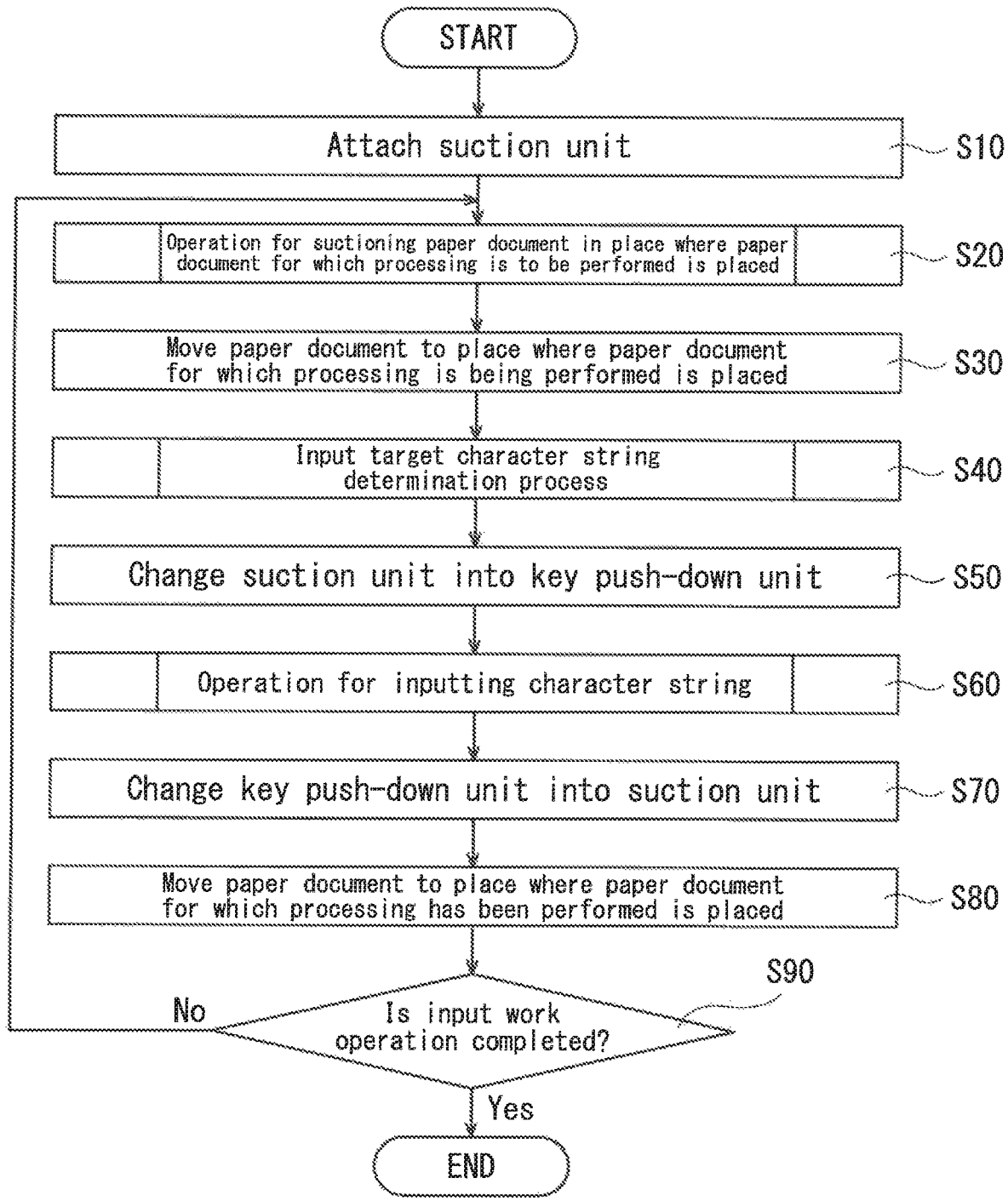
FIG. 6A is a flowchart showing an example of the operation of the robot system of FIG. 1.

Initially, as shown in FIG. 6A, the robot control section 75 causes the hand 23 of the first robot arm 13A to hold the first suction tool 51 placed on the first tool table 120A, and attaches the first suction tool 51 on the first robot arm 13A. In addition, the robot control section 75 causes the hand 23 of the second robot arm 13B to hold the second suction tool 52 placed on the second tool table 120B, and attaches the second suction tool 52 on the second robot arm 13B (step S10).

Figure 8A:
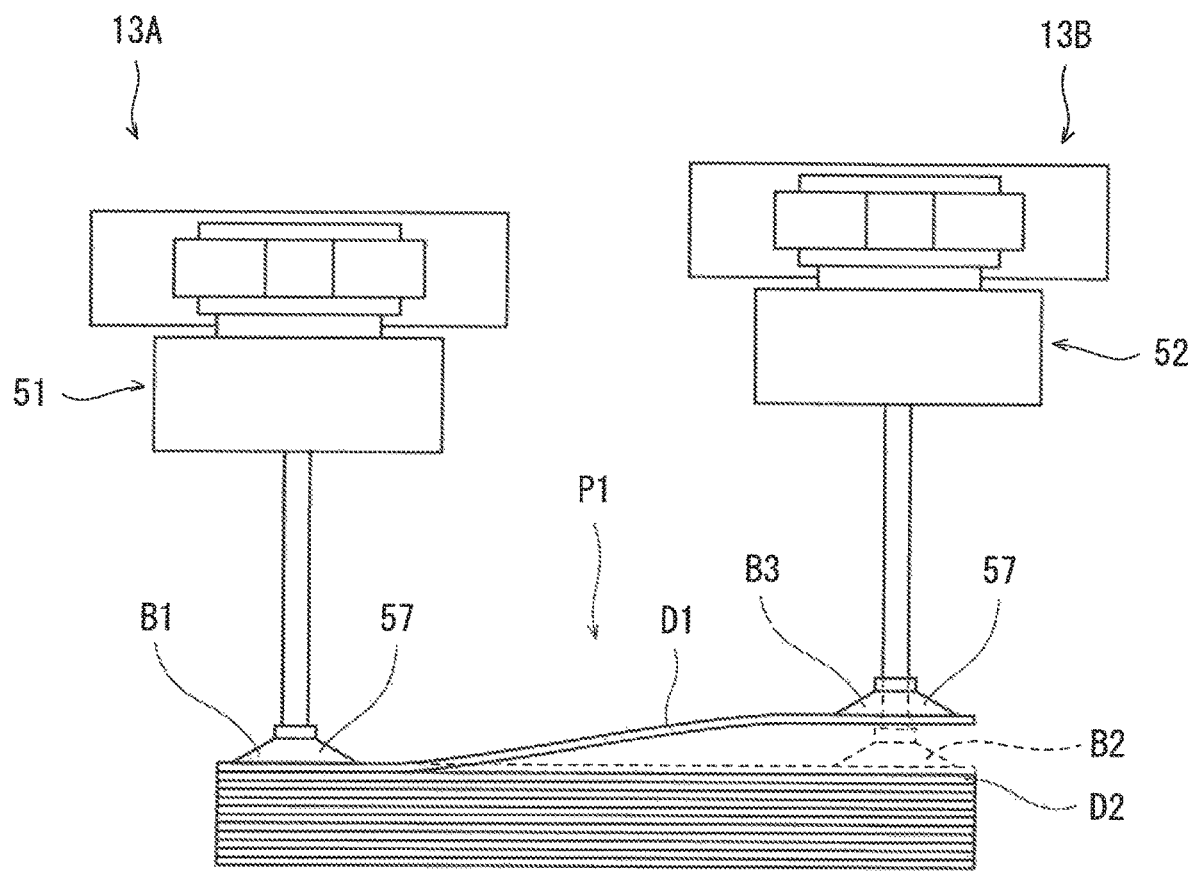
FIG. 8A is a front view showing an example of the operation of the robot system of FIG. 1, and showing an example of an operation for picking up a paper sheet from paper documents piled up.
Figure 8B:
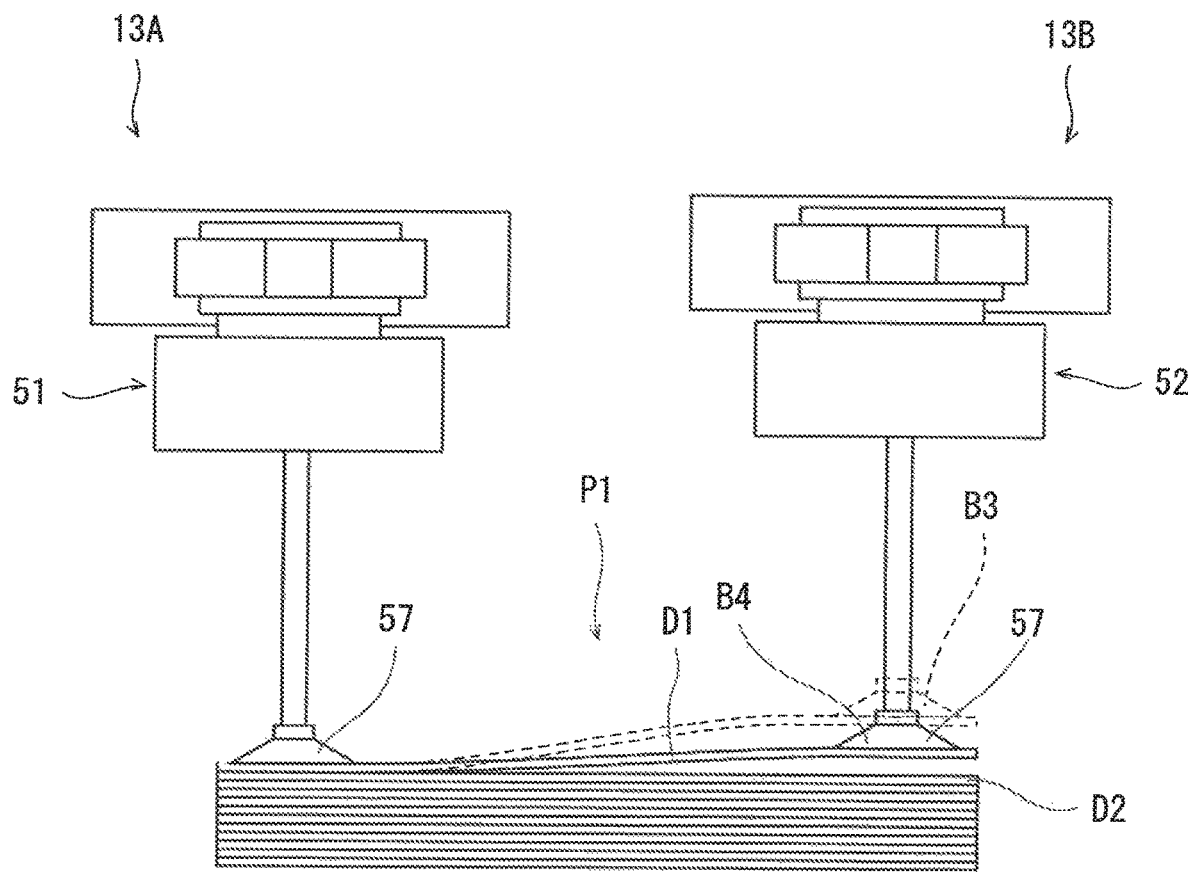
FIG. 8B is a front view showing an example of the operation of the robot system of FIG. 1, and showing an example of an operation for picking up the paper sheet from the paper documents piled up.

FIGS. 8A and 8B are front views showing an example of the operation for suctioning the invoices piled up.

Then, the control section 65 performs the operation for suctioning an invoice D1 present at an uppermost position, among the invoices piled up on the place P1 (step S20).

Figure 6B:
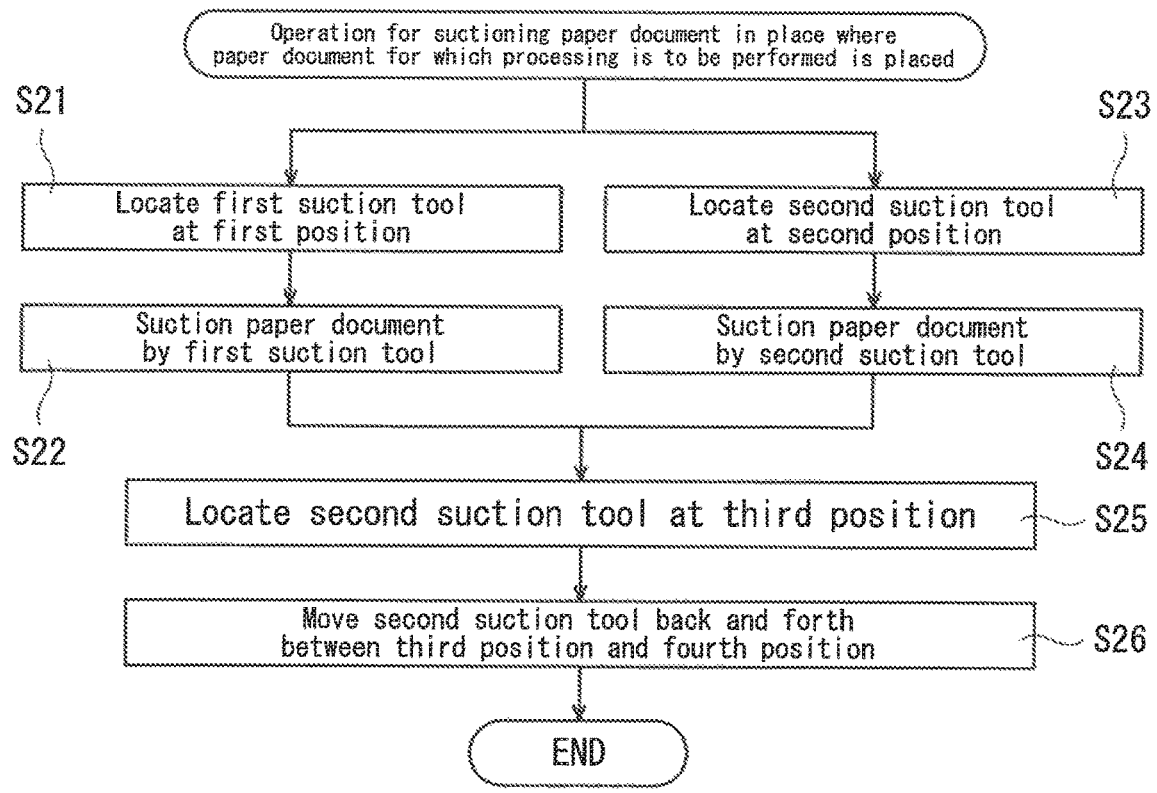
FIG. 6B is a flowchart showing an example of the operation of the robot system of FIG. 1.

Specifically, as shown in FIGS. 6B and 8A, the robot control section 75 controls the first robot arm 13A to locate the first suction tool 51 at a first position B1 where the suction pads 75 of the first suction tool 51 contact an upper surface of a region which is in the vicinity of one of the pair of opposite side edges (long sides) of the invoice D1 (step S21). Then, the suction unit control section 76 controls the suction unit 5 to cause the first suction tool 51 to suction the invoice D1 (step S22). Concurrently with step S21 and step S22, the robot control section 75 controls the second robot arm 13B to locate the second suction tool 52 at a second position B2 where the suction pads 75 of the second suction tool 52 contact an upper surface of a region which is in the vicinity of the other of the pair of opposite side edges of the invoice D1 (step S23). Then, the suction unit control section 76 controls the suction unit 5 to cause the second suction tool 52 to suction the invoice D1 (step S24). When the operation in step S22 and the operation in step S24 are completed, the robot control section 75 controls the second robot arm 13B to move the second suction tool 52 to a third position B3 that is above the second position B2 (step S25). Then, as shown in FIGS. 6B and 8B, the robot control section 75 controls the second robot arm 13B to move the second suction tool 52 back and forth between a fourth position B4 that is between the second position B2 and the third position B3, and the third position B3 (step S26). Then, the operation for suctioning the invoice is completed. The third position B3 is defined as a position where the second suction tool 52 is relatively higher than the first suction tool 51, in a normal line direction of the extending surface of the invoice D1 placed on the place P1.

Then, as shown in FIGS. 6A, 1 and 7, the robot control section 75 controls the first robot arm 13A and the second robot arm 13B to move the first suction tool 51 and the second suction tool 52 to move the invoice D1 suctioned by the first suction tool 51 and the second suction tool 52 from the place P1 to the place P2 (step S30). At this time, the invoice D1 is moved in a direction crossing the normal line direction of the upper surface of the invoice D1, namely, to a lateral side. When the invoice D1 is located on the place P2, the suction unit control section 76 controls the suction unit 5 to release the invoice D1 from the first suction tool 51 and the second suction tool 52.

Thus, in the robot system 100, in a case where the invoice D1 present at the uppermost position, of the invoices piled up, is picked up and moved from the place P1 to the place P2, one of the suction tools (second suction tool 52) located at the second position B2 is moved to a position (third position B3) that is above the other suction tool (first suction tool 51). This makes it possible to prevent a situation in which the invoice D1 and an invoice D2 present under the invoice D1 adhere to each other by an influence of static electricity or the like and are lifted-up simultaneously. In the robot system 100, one of the suction tools is located at the position (third position B3) that is above the other suction tool, and then is moved back and forth between the third position B3 and the fourth position B4. Therefore, it becomes possible to more effectively prevent the adhesion between the invoice D1 and the invoice D2.

Then, the control section 65 performs determination process of the character string as the input target of the invoice D1, as follows (step S40).

Figure 6C:
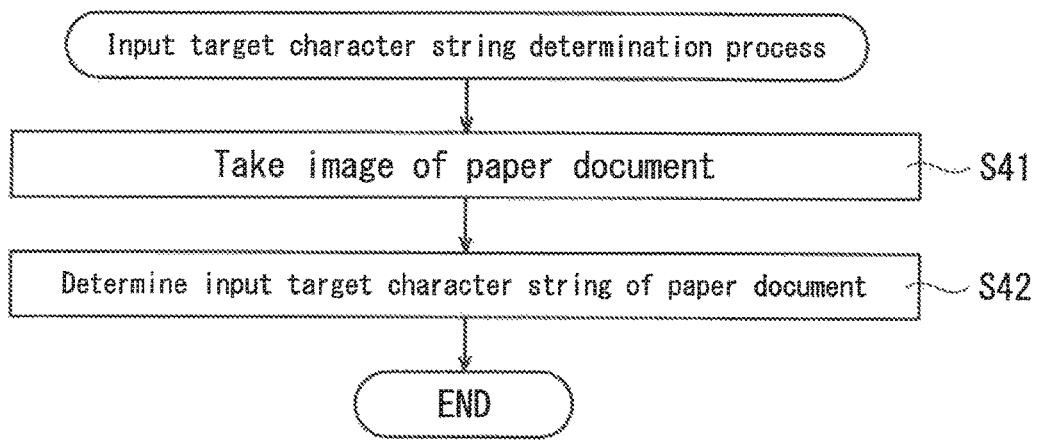
FIG. 6C is a flowchart showing an example of the operation of the robot system of FIG. 1.

As shown in FIG. 6C, in the above-described determination process, initially, the control section 65 causes the first camera 61 to take an image of the paper surface of the invoice D1, to obtain the image data of the paper surface of the invoice D1 (step S41). Specifically, the robot control section 75 controls the first robot arm 13A to locate the first camera 61 attached on the first robot arm 13A at a position that is above the place P2. Then, the imaging device control section 70 takes an image of the invoice D1 located on the place P2 to obtain the image data of the paper surface of the invoice D1.

FIG. 9 is a view showing an example of the image of the invoice D1 (paper document) which has been taken by the first camera 61 of the imaging device 6.

Then, as shown in FIG. 9, the character string determiner section 72 determines the input target character strings of the invoice D1, namely, the character string written in item column A1 of Parts Number of the invoice D1, the character string written in item column A2 of Quantity of the invoice D1, the character string written in item column A3 of Unit Price of the invoice D1, and the character string written in item column A4 of Amount of the invoice D1 (step S42). For example, the character string determiner section 72 recognizes the character string of "Parts Number" or "Part No." similar to "Parts Number" contained in the image of the paper surface of the invoice D1 and its position, and determines the character string "APL-02" indicated below the character string of "Parts Number" or "Part No." is the character string written in the item column A1 of Parts Number. In the same manner, the character string determiner section 72 determines the character string "1" indicated below the character string of "Quantity" is the character string written in the item column A2 of Quantity, the character string "3.00" indicated below the character string of "Unit Price" is the character string written in the item column A3 of Unit Price, and the character string "3.00" indicated below the character string of "Amount" is the character string written in the item column A4 of Amount. Then, the character string determiner section 72 terminates the determination process for the character strings which are the input target.

Then, the robot control section 75 places the first suction tool 51 held by the hand 23 of the first robot arm 13A on the first tool table 120A. Then, the robot control section 75 causes the hand 23 of the first robot arm 13A to hold the first manipulation tool 41 placed on the first tool table 120A, and causes the first manipulation tool 41 to be attached on the first robot arm 13A. Also, the robot control section 75 places the second suction tool 52 held by the hand 23 of the second robot arm 13B on the second tool table 120B. Then, the robot control section 75 causes the hand 23 of the second robot arm 13B to hold the second manipulation tool 42 placed on the second tool table 120B, and causes the second manipulation tool 42 to be attached on the second robot arm 13B. In this way, the tool held by the robot 1 is changed from the suction unit 5 into the manipulation tool unit 4 (step S50).

Then, the control section 65 performs the operation for inputting the character strings as follows (step S60).

Figure 6D:
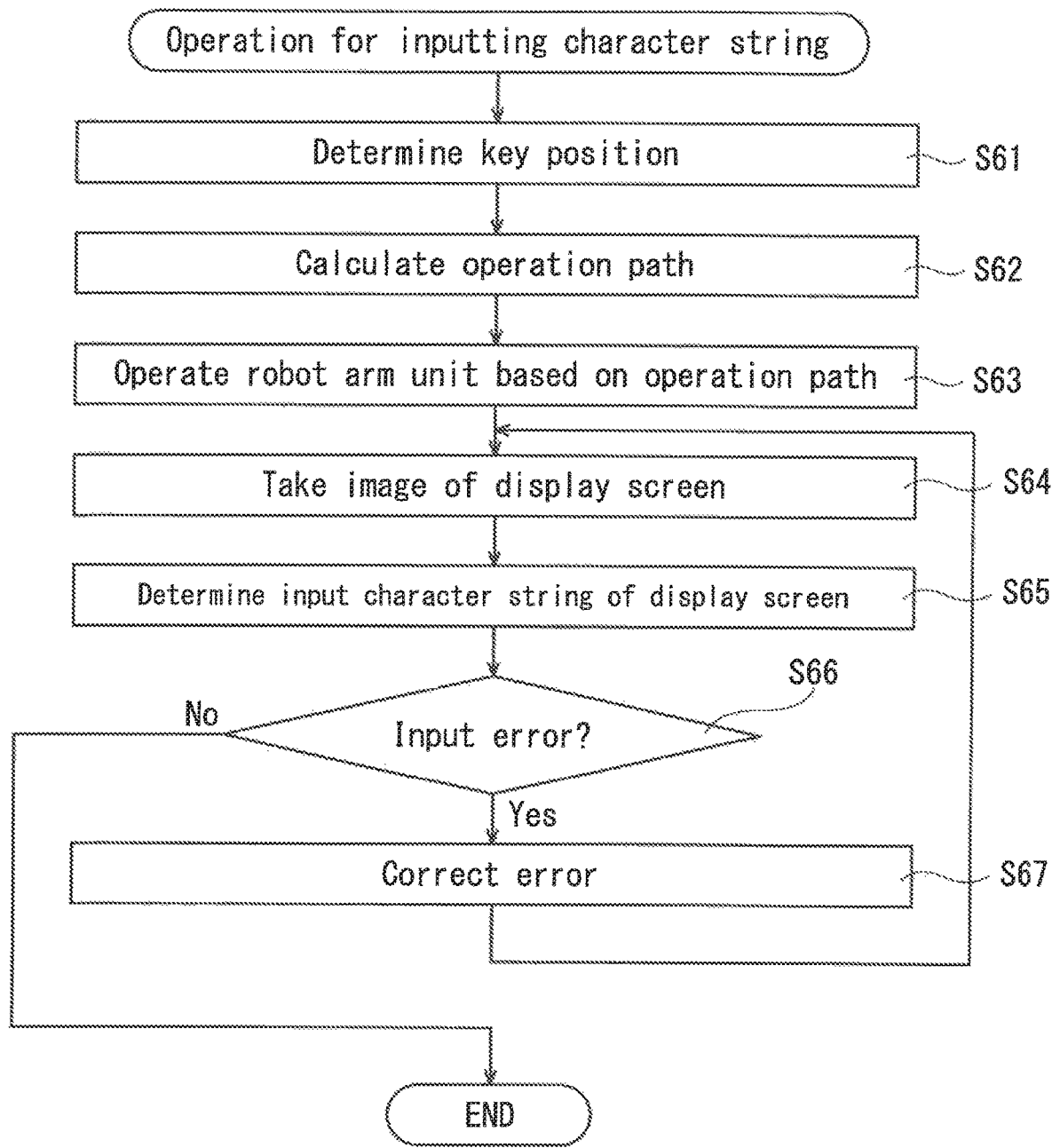
FIG. 6D is a flowchart showing an example of the operation of the robot system of FIG. 1.

Specifically, as shown in FIGS. 6D and 9, in the operation for inputting the character strings, initially, the key position determiner section 73 determines the position of the key corresponding to each character of the character string of "APL-02" written in the item column A1 of Parts Number. More specifically, the key position determiner section 73 determines key position of "A", key position of "P", key position of "L", key position of "-", key position of "0", and key position of "2", based on the position information of the keys 111a of the keyboard 111 stored in the memory section 66. In the same manner, the key position determiner section 73 determines the position of the key corresponding to each character of the character strings written in the item columns of Quantity, Unit Price, and Amount (step S61).

Then, the path calculation section 74 calculates the operation path on which the robot arm unit 13 operates so that the manipulation tool unit 4 moves while pushing down "A" key, "P" key, "L" key, "-" key, "0" key, and "2" key of the keyboard 111, corresponding to the item column of Parts Number. In the same manner, the path calculation section 74 calculates the operation paths on which the robot arm unit 13 operates so that the manipulation tool unit 4 moves while pushing down the keys corresponding to the item columns of Quantity, Unit Price, and Amount (step S62). Note that the path calculation section 74 adds and deletes the key to be pushed down, depending on the manipulation method of the information processing device 110. For example, in a case where a manipulation corresponding to an instruction for shifting an active input target item is an operation for pushing down Tab key, in the information processing device 110, the path calculation section 74 calculates the operation path of the robot arm unit 13 so that the manipulation tool unit 4 pushes down the Tab key to shift the active input target item from the item of Parts Number to the item of Quantity, before the manipulation tool unit 4 pushes down "1" key in the item of Quantity, after the operation for pushing down the character string of the item in Parts Number is completed, namely, the manipulation tool unit 4 has pushed down "2" key.

In the present embodiment in which the robot 1 is the dual-arm robot, the path calculation section 74 calculates the first operation path of the first robot arm 13A and the second operation path of the second robot arm 13B for allowing the first robot arm 13A and the second robot arm 13B to operate cooperatively so that for the item of Parts Number, the second manipulation tool 42 held by the second robot arm 13B pushes down "A" key located in the left region K2 (see FIG. 7) of the keyboard 111, then the first manipulation tool 41 held by the first robot arm 13A pushes down "P" key, "L" key, "-" key, and "0" key located in the right region K1 (see FIG. 7) of the keyboard 111 in this order, and then the second manipulation tool 42 held by the second robot arm 13B pushes down "2" key located in the left region K2 (see FIG. 7) of the keyboard 111. This makes it possible to reduce a movement distance of each of the first manipulation tool 41 and the second manipulation tool 42, and to quickly input the information by use of the keyboard 111.

Then, the robot control section 75 controls the first robot arm 13A based on the first operation path calculated by the path calculation section 74 and controls the second robot arm 13B based on the second operation path calculated by the path calculation section 74 (step S63). With this control, the character string as the input target of the invoice D1 is input to the information processing device 110 by the keyboard 111. Note that the key of the keyboard 111 may be pushed down by the operation of the linear-motion joint J3. Thus, the operation for pushing down the key 111a of the keyboard 111 can be carried out with a simple configuration. In addition, the operation for pushing down the key 111a of the keyboard 111 can be carried out at a higher speed.

Then, the control section 65 causes the second camera 62 to take an image of the display screen 112a of the display device 112 to obtain the image data of the display screen 112a (step S64). Specifically, the robot control section 75 controls the second robot arm 13B to locate the second camera 62 attached on the second robot arm 13B so that the second camera 62 faces the display screen 112a. Then, the imaging device control section 70 takes an image of the display screen 112a to obtain the image data of the display screen 112a.

Figure 10:
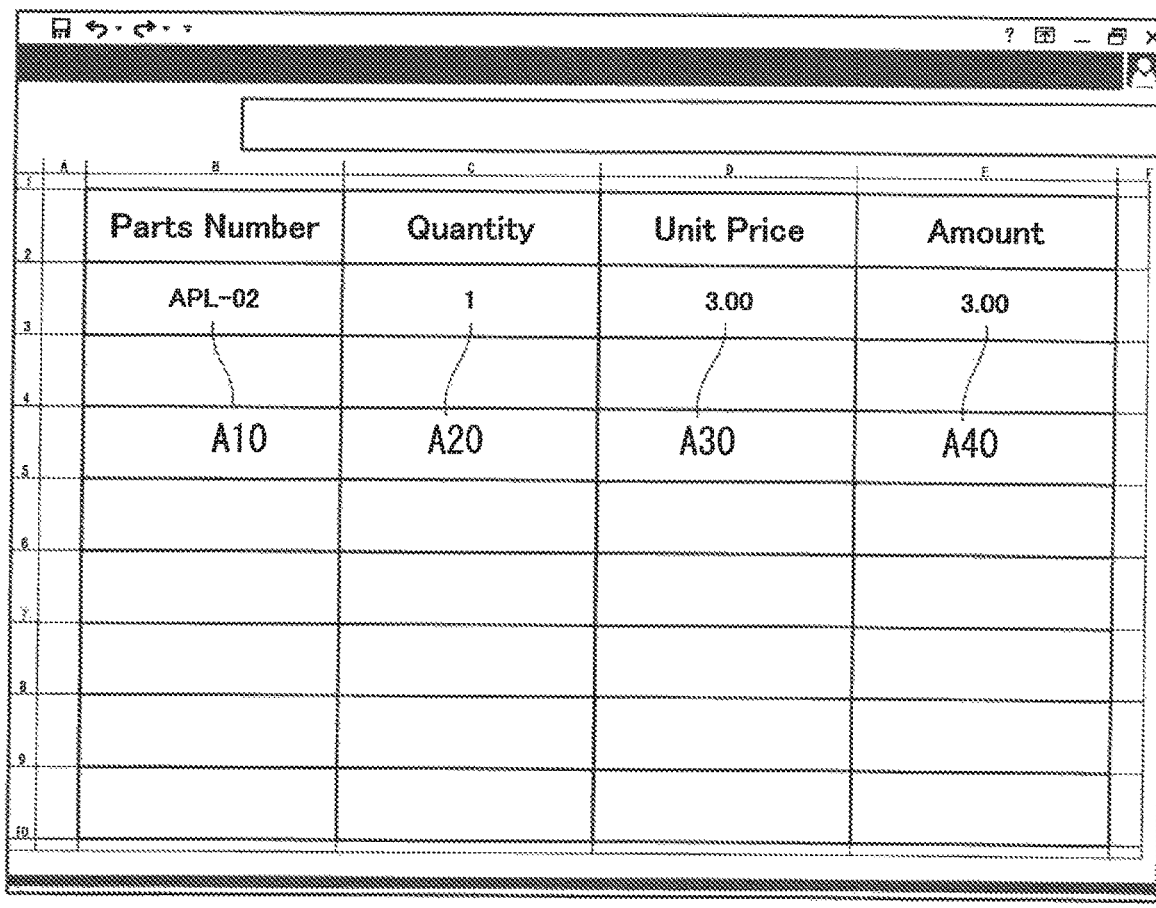
FIG. 10 is a view showing an example of an image of a display screen of a display device which is taken by the imaging device of the robot system of FIG. 1.

FIG. 10 is a view showing the image of the display screen 112a of the display device 112 which is taken by the second camera 62 of the imaging device 6.

Next, the character string determiner section 72 determines the input character string having been input by the keyboard 111 and contained in the image data of the display screen 112a, namely, the character string written in item column A10 of Parts Number of the display screen 112a, the character string written in item column A20 of Quantity of the display screen 112a, the character string written in item column A30 of Unit Price of the display screen 112a, and the character string written in item column A40 of Amount of the display screen 112a (step S65). For example, the character string determiner section 72 recognizes the character string of "Parts Number" contained in the image of the display screen 112a and its position, and determines the character string "APL-02" indicated below the character string of "Parts Number" is the character string written in the item column of Parts Number. In the same manner, the character string determiner section 72 determines the character string "1" indicated below the character string of "Quantity" is the character string written in the item column of Quantity, the character string "3.00" indicated below the character string of "Unit Price" is the character string written in item column of Unit Price, and the character string "3.00" indicated below the character string of "Amount" is the character string written in the item column of Amount.

Then, the input error determiner section 77 determines whether or not the input target character strings contained in the image data of the invoice D1 and written in the item columns of Parts Number, Quantity, Unit Price, and Amount match check target character strings (character strings to be checked) contained in the image data of the display screen 112a and written in the item columns of Parts Number, Quantity, Unit Price, and Amount. In this way, the input error determiner section 77 determines whether or not there is an input error.

In a case where the input error determiner section 77 determines that the input target character strings do not match the check target character strings and there is an input error (Yes in step S66), the control section 65 performs an operation for correcting the character string in the item column corresponding to the input error, according to the manipulation method of the information processing device 110 (in step S67). For example, the control section 65 operates the robot arm unit 13 to manipulate the keyboard to delete the character string in the item column corresponding to the input error, and further manipulates the keyboard to input the character string in the item column corresponding to the input error again. Then, the control section 65 performs step S64 and the following steps. A worker in a supervisory or management position, who is in charge of the input work operation, may be notified that the input target character strings do not match the check target character strings.

On the other hand, in a case where the input error determiner section 77 determines that the input target character strings match the check target character strings and there is no input error (No in step S66), the control section 65 terminates the work operation for inputting the character strings.

Then, as shown in FIG. 6A, the robot control section 75 changes the tool held by the robot 1 from the manipulation tool unit 4 into the suction unit 5 (step S70). This operation is the same as the operation in step S50 except that the kind of the tool to be detached or attached is different.

Then, the robot control section 75 controls the robot arm unit 13 to move the invoice D1 from the place P2 to the place P3 (step S80). Specifically, the robot control section 75 causes the suction unit 5 to contact the invoice D1 present in the place P2, and the suction unit control section 76 controls the suction unit 5 to suction the invoice D1. Then, the robot control section 75 controls the robot arm unit 13 to move the invoice D1 to the place P3. Then, the suction unit control section 76 controls the suction unit 5 to release the invoice D1.

Then, the control section 65 determines whether or not the work operation for inputting the character strings of all of the invoices piled up on the place P1 (step S90). For example, the control section 65 determines whether or not the invoice remains (is left) on the place P1 based on the image of the place P1 taken by the first camera 61.

Then, in a case where the control section 65 determines that the invoice remains on the place P1 and the work operation for inputting the character strings of all of the invoices piled up on the place P1 is not completed (No in step S90), the control section 65 performs step S20 and the following steps. Specifically, after the work operation for inputting the character strings of the invoice D1 is performed, the control section 65 performs the work operation for inputting the character strings of the invoice D2.

In contrast, in a case where the control section 65 determines that the work operation for inputting the character strings of all of the invoices piled up on the place P1 is completed (Yes in step S90), the control section 65 terminates a series of work operations for inputting the character strings of the invoices.

As described above, the robot system 100 of the present invention is able to properly perform the work operation for inputting the character information written in the invoices (paper documents) to the information processing device 110 including the keyboard 111, by manipulating the keyboard 111. In this way, the robot is able to perform the work operation for inputting the character information of the character strings written in the invoices to the information processing device 110, by manipulating the keyboard 111, in place of the desk worker. The information processing device 110 is able to perform specified information processing based on the information input by the robot system 100. In a case where the robot system 100 performs the work operation for inputting the character information, in place of the desk worker, it is not necessary to change the configuration of the information processing device 110, and the robot system 100 can be introduced smoothly and quickly.

Embodiment 2

Figure 11:
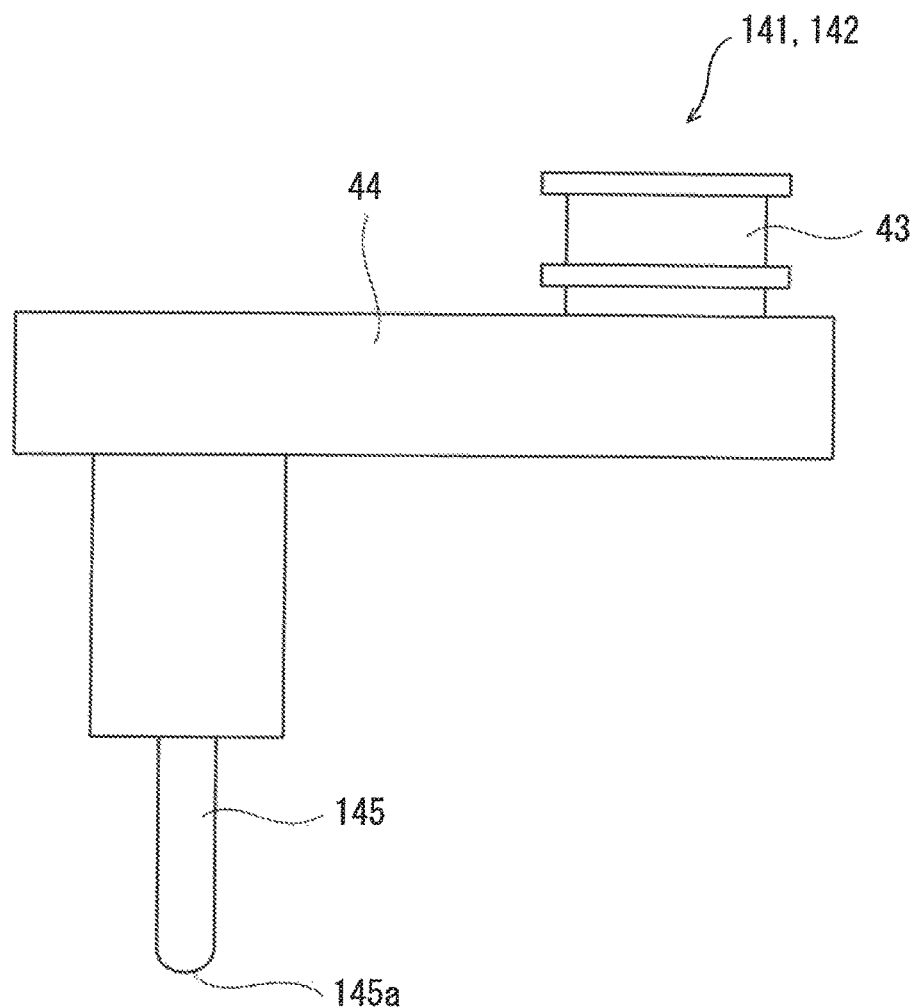
FIG. 11 is a side view showing an example of the configuration of a manipulation tool unit of a robot system according to Embodiment 2 of the present invention.

FIG. 11 is a side view showing an example of the configuration of a first manipulation tool 141 and a second manipulation tool 142 according to the present embodiment.

As shown in FIG. 11, a lower surface 145a of a contact element 145 of each of the first manipulation tool 141 and the second manipulation tool 142 may be curved to protrude in a downward direction. In this structure, since the lower surface 145a contacts the key 111a in a limited region, an input error can be prevented.

Embodiment 3

Hereinafter, regarding configuration and operations according to Embodiment 3, differences from Embodiment 1 will be described mainly.

Figure 12:
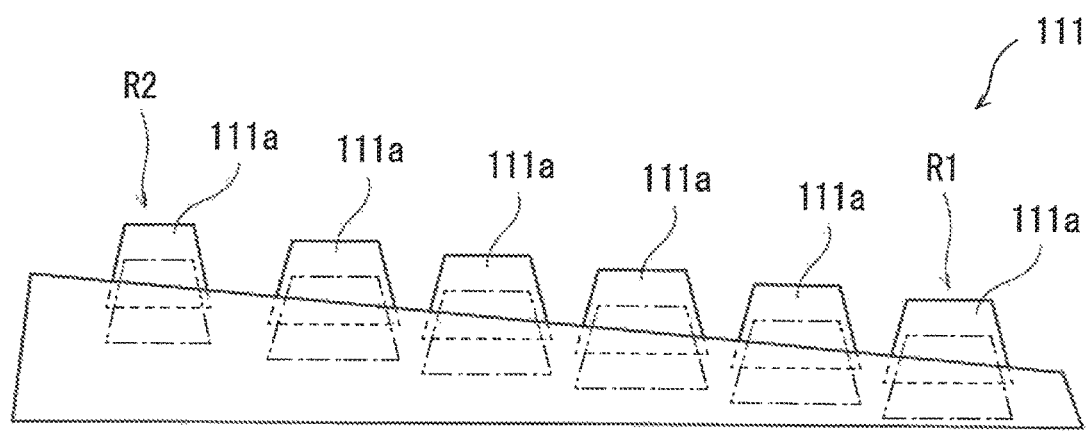
FIG. 12 is a side view showing an example of the configuration of a hardware keyboard manipulated by a manipulation tool unit of a robot system according to Embodiment 3 of the present invention.

FIG. 12 is a side view showing an example of the configuration of the keyboard 111.

As shown in FIG. 12, each of the keys 111a of the keyboard 111 is biased by a spring provided inside the key 111a and located at an upper limit position. Each of the keys 111a is configured to be pushed down to a lower limit value indicated by dot-and-dash line of FIG. 12. When viewed from the position of the robot 1, a plurality of key columns of the keyboard 111 are configured to have a vertical level which becomes higher from a key column R1 on a near side toward a key column R2 on a far side.

Figure 13A:
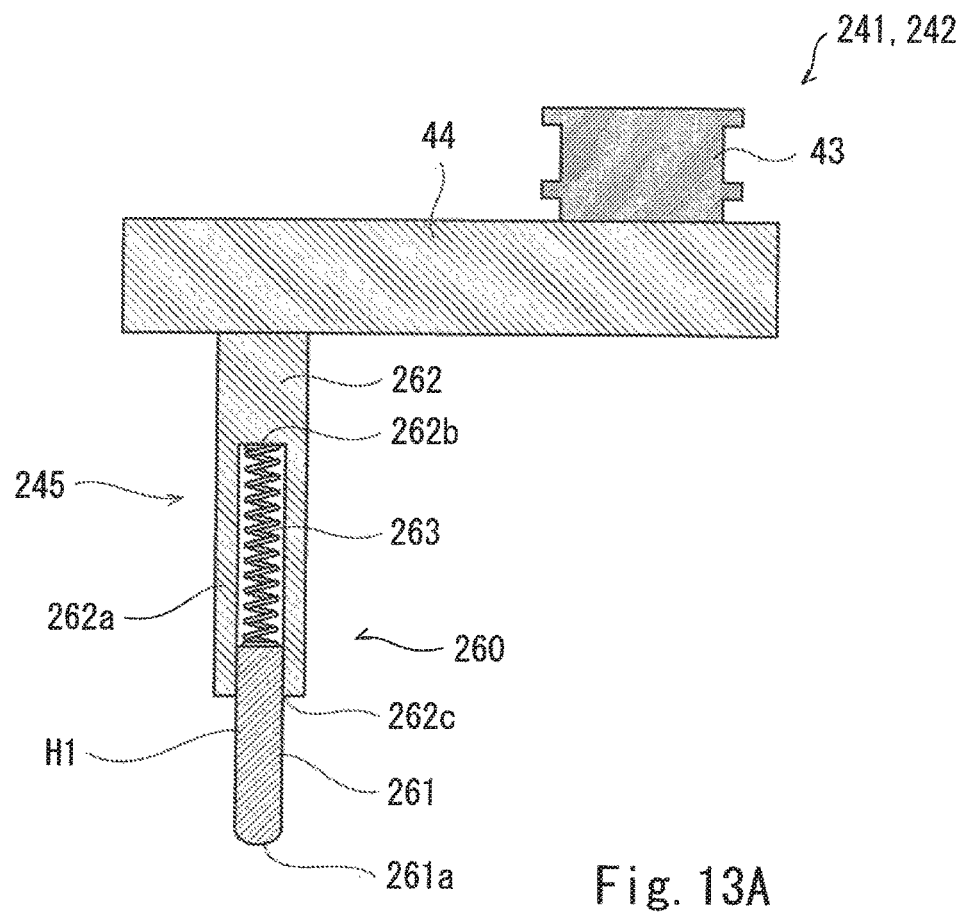
FIG. 13A is a cross-sectional view showing an example of the configuration of the manipulation tool unit of the robot system according to Embodiment 3 of the present invention, and showing a state in which an up-down element is at a lower limit position.
Figure 13B:
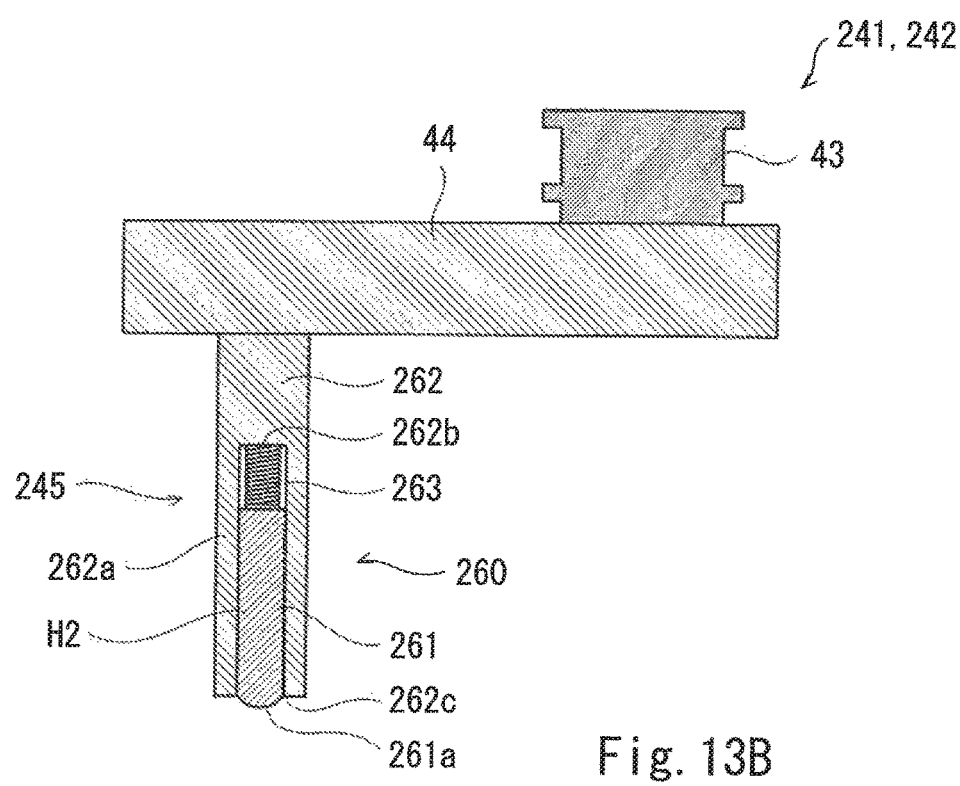
FIG. 13B is a view showing a state in which the up-down element of FIG. 13A is at the lower limit position.

FIG. 13A is a cross-sectional view showing an example of the configuration of a first manipulation tool 241 and the configuration of a second manipulation tool 242, and a state in which an up-down element 261 is located at a lower limit position H1. FIG. 13B is a cross-sectional view showing an example of the configuration of the first manipulation tool 241 and the configuration of the second manipulation tool 242, and a state in which the up-down element 261 is located at an upper limit position H2.

In the above-described Embodiment 1, the contact element 45 of each of the first manipulation tool 41 and the second manipulation tool 42 is a column-shaped member which is made of an elastic material and extends downward from the tip end portion of the base member 44.

In contrast, in the present embodiment, as shown in FIGS. 13A and 13B, the contact element 245 of each of the first manipulation tool 241 and the second manipulation tool 242 includes a float mechanism 260 including an up-down element 261, a support element 262, and an elastic element 263.

The up-down element 261 is configured to contact the key 111a. The up-down element 261 has a stiffness higher than that of the elastic element 263. The tip end element 261 is made of, for example, a resin. However, this is exemplary, and the up-down element 261 may be made of metal or a wood.

The support element 262 is configured to support and guide the up-down element 261 so that the up-down element 261 is movable between the lower limit position H1 of FIG. 13A and the upper limit position H2 of FIG. 13B that is above the lower limit position H1. The support element 262 is, for example, a tubular member whose upper end is closed and whose lower end is opened. Specifically, the support element 262 has a tubular peripheral wall 262a, an upper wall 262b, and an opening 262c. In an inner space of the support element 262, the upper end portion of the up-down element 261 and the elastic element 263 are located. The lower limit position H1 of the up-down element 261 is defined so that the lower surface 261a of the up-down element 261 protrudes in the downward direction to a position that is below the opening 262c of the up-down element 261.

The elastic element 263 extends in the vertical direction. The upper end portion of the elastic element 263 contacts the upper wall 262b of the support element 262. The lower end portion of the elastic element 263 contacts the upper end of the up-down element 261. The elastic element 263 is disposed between the up-down element 261 and the support element 262. The elastic element 263 is, for example, a compressive spring. The elastic element 263 is compressed in the vertical direction, namely, axial direction by the movement of the up-down element 261 from the lower limit position H1 toward the upper limit position H2, and biases the up-down element 261 in a direction from the upper limit position H2 toward the lower limit position H1. More specifically, the elastic element 263 is configured to generate a biasing force (elastic repulsive force) for biasing the up-down element 261 in the direction from the upper limit position H2 toward the lower limit position H1. This biasing force is set higher than a spring pressure (elastic repulsive force) of the key 111a of the keyboard 111. By pushing down the keyboard 111 by the float mechanism 260, the biasing force of the elastic element 263 exceeds the biasing force of the spring accommodated in the key 111a, and the key 111a can be pushed down.

As described above, the up-down element 261 of the float mechanism 260 is movable between the lower limit position H1 and the upper limit position H2, in a state in which the up-down element 261 is biased in the direction from the upper limit position H2 toward the lower limit position H1. For example, a distance between the lower limit position H1 and the upper limit position H2, namely, a stroke of the up-down element 261, may be set larger than a difference in vertical level between the key column R1 on a near side of the keyboard 111 and the key column R2 on a far side of the keyboard 111 (see FIG. 14).

The memory section 66 (see FIG. 5) contains therein position information of a vertical position Hd at which the pushing down of the key 111a is finished (completed). The vertical position Hd (see FIG. 14) is a position at which each of the first manipulation tool 241 and the second manipulation tool 242 finishes the operation for pushing down of the key 111a of the keyboard 111. The vertical position Hd is a position from which each of the first manipulation tool 241 and the second manipulation tool 242 moves upward.

The other constituents are similar to those of the above-described Embodiment 1, and will not be described in detail.

[Example of Operation]

Figure 14:
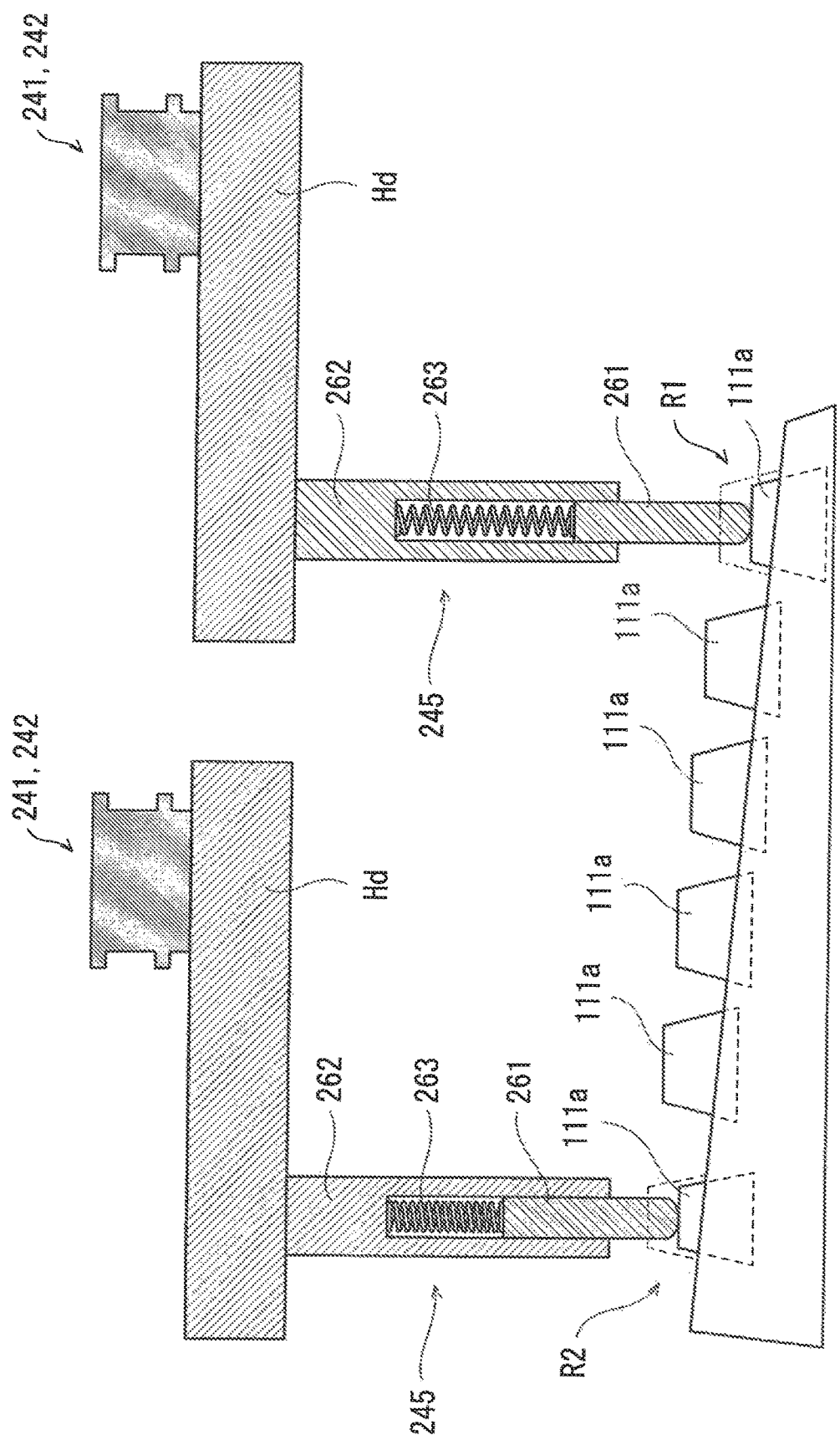
FIG. 14 is a view showing an example of the operation of the robot system according to Embodiment 3 of the present invention.

FIG. 14 is a view showing an example of the operation of the robot system.

As shown in FIG. 6D, in step S63, the robot control section 75 controls the first robot arm 13A or the second robot arm 13B to move the first manipulation tool 241 or the second manipulation tool 242 to a position that is above the key 111a to be pushed down. Then, the robot control section 75 moves the first manipulation tool 241 or the second manipulation tool 242 down toward the pre-set vertical level Hd at which the pushing down of the key 111a is finished. By this operation, the lower surface 261a of the up-down element 261 contacts the key 111a of the keyboard 111, and the up-down element 261 pushes down the key 111a. At this time, the biasing force generated by the elastic element 263 exceeds the biasing force generated by the spring accommodated in the key 111a, and thus the key 111a is pushed down. When the key 111a is pushed down and reaches the lower limit position, the up-down element 261 moves from the lower limit position H1 toward the upper limit position H2, relative to the support element 262. When the first manipulation tool 241 or the second manipulation tool 242 reaches the vertical position Hd, the robot control section 75 moves the first manipulation tool 241 or the second manipulation tool 242 upward to its original position.

As described above, the elastic element 261 of the float mechanism 260 is movable between the lower limit position H1 and the upper limit position H2, in a state in which the up-down element 261 is biased in the direction from the upper limit position H2 toward the lower limit position H1. Therefore, by setting the vertical position Hd at which the pushing down of the key 111a is finished (completed) to an arbitrary position between the lower limit position H1 and the upper limit position H2, the key 111a can be pushed down. This makes it possible to prevent a situation in which a high load is applied to the key 111a of the keyboard 111. For example, the vertical position Hd may be defined so that the lower surface 261a of the up-down element 261 located at a middle position between the lower limit position H1 and the upper limit position H2 is located at the lower limit position of the key 111a of the keyboard 111. This allows the float mechanism 260 to absorb a position error of the vertical position Hd. As a result, the configuration of the robot system 100 can be simplified.

For example, as shown in FIG. 14, the vertical position Hd at which the pushing-down of the key 111a is finished (completed) may be defined as a position corresponding to the lower limit position of the key 111a of the key column R1 on a near side (or a position that is in the vicinity of the lower limit position of the key 111a). In this setting, in a state in which the key 111a of the key column R1 on a near side is pushed down and the first manipulation tool 241 or the second manipulation tool 242 is located at the vertical level Hd, the up-down element 261 is located at the lower limit position H1 (or a position that is in the vicinity of the lower limit position H1). In contrast, in a state in which the key 111a of the key column R2 on a far side is pushed down and the first manipulation tool 241 or the second manipulation tool 242 is located at the vertical level Hd, the up-down element 261 is located at a position that is closer to the upper limit position H2 rather than the lower limit position H1. Therefore, it is not necessary to set the vertical position Hd at which the pushing down of the key 111a is finished (completed), for each of the case where the key 111a of the key column R1 on a near side is pushed down and the case where the key 111a of the key column R2 on a far side is pushed down. Therefore, the configuration of the robot system 100 can be simplified.

Embodiment 4

Hereinafter, regarding configuration and operations according to Embodiment 4, differences from Embodiment 1 will be described mainly.

Figure 15:
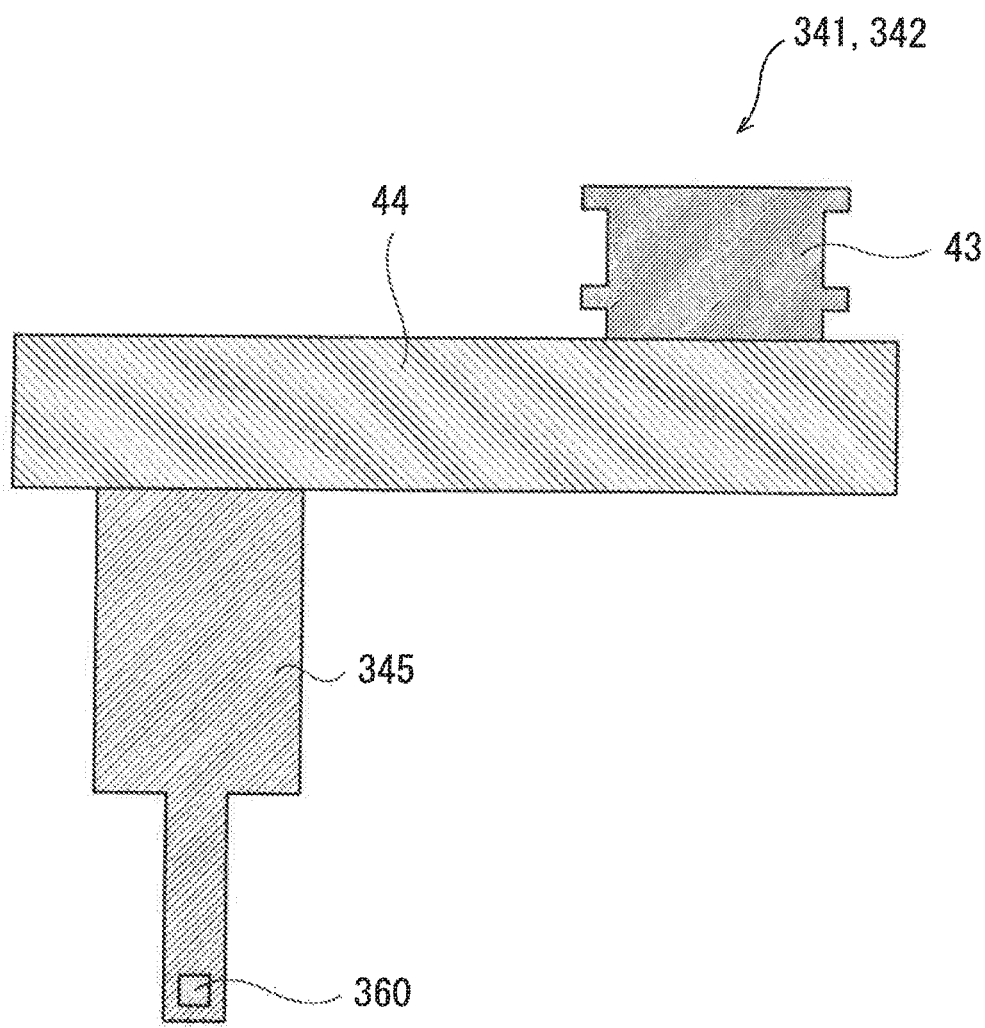
FIG. 15 is a cross-sectional view showing an example of the configuration of a manipulation tool unit of a robot system according to Embodiment 4 of the present invention.

FIG. 15 is a cross-sectional view showing an example of the configuration of a first manipulation tool 341 and a second manipulation tool 342 according to the present embodiment.

In the above-described Embodiment 1, the character input device is the hardware keyboard 111. In contrast, in the present embodiment, the character input device is an electromagnetic induction touch panel display input device. A region corresponding to an image of each key of a software keyboard displayed on a display screen of the touch panel display input device constitutes a manipulation part.

In the above-described Embodiment 1, the contact element 45 of each of the first manipulation tool 41 and the second manipulation tool 42 is the column-shaped member made of the elastic material and extending downward from the tip end portion of the base member 44. In contrast, in the present embodiment, as shown in FIG. 15, a contact element 345 of each of a first manipulation tool 341 and a second manipulation tool 342 is a column-shaped member extending downward from the tip end portion of the base member 44 and contains therein a magnetic field generating element 360 for generating a magnetic field. The character input device is configured to detect the magnetic field generated by the magnetic field generating element 360 and identify a position at which the first manipulation tool 341 or the second manipulation tool 342 contacts (touches) the display screen.

Thus, in a case where the character input device is the electromagnetic induction touch panel display input device, the work operation for inputting the character information written in the paper document can be performed by manipulating the manipulation part of the character input device.

Embodiment 5

Hereinafter, regarding configuration and operations according to Embodiment 5, differences from Embodiment 1 will be described mainly.

Figure 16:
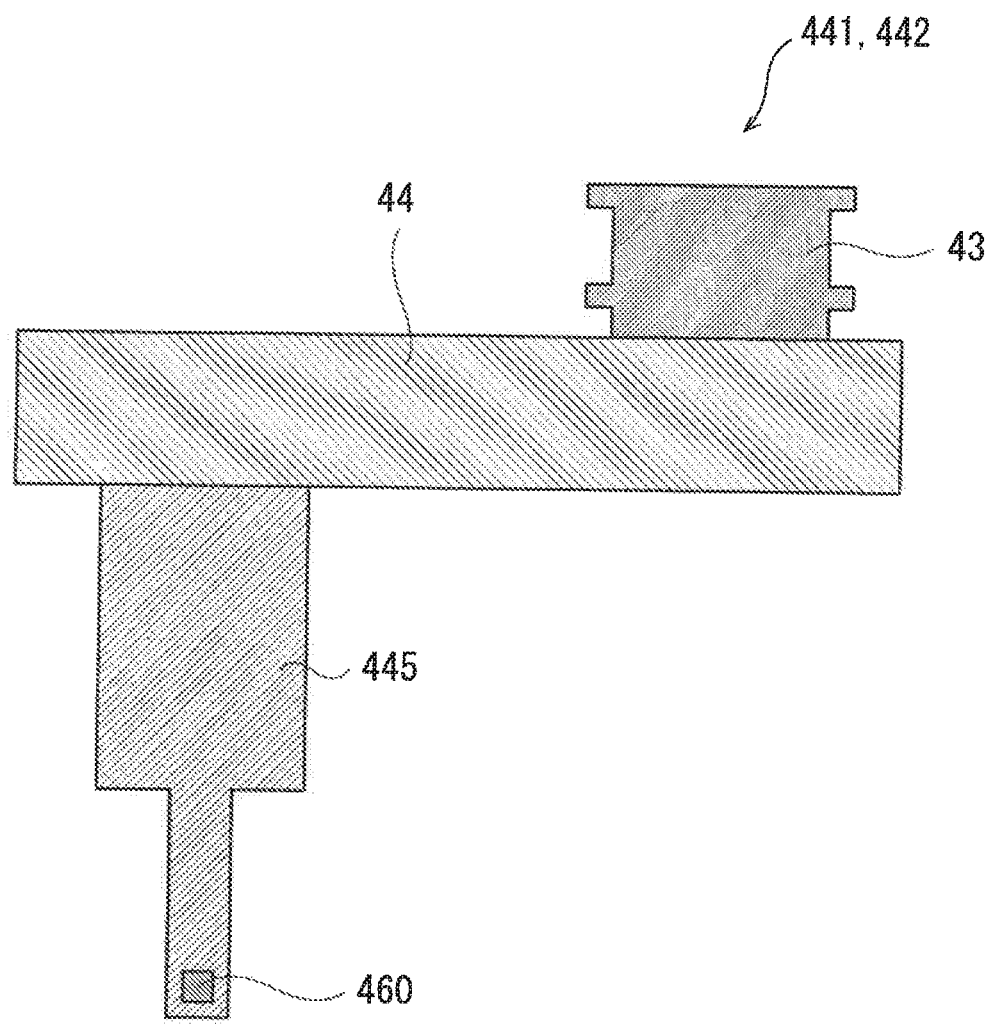
FIG. 16 is a cross-sectional view showing an example of the configuration of a manipulation tool unit of a robot system according to Embodiment 5 of the present invention.

FIG. 16 is a cross-sectional view showing an example of the configuration of a first manipulation tool 441 and the configuration of a second manipulation tool 442 according to the present embodiment.

In the above-described Embodiment 1, the character input device is the hardware keyboard 111. In contrast, in the present embodiment, the character input device is an electrostatic capacitance touch panel display input device. An electric field is formed on the surface of the display screen. A region corresponding to an image of each key of a software keyboard displayed on the display screen of the touch panel display input device constitutes a manipulation part.

In the above-described Embodiment 1, the contact element 45 of each of the first manipulation tool 41 and the second manipulation tool 42 is the column-shaped member made of the elastic material and extending downward from the tip end portion of the base member 44. In contrast, in the present embodiment, as shown in FIG. 16, a contact element 445 of each of a first manipulation tool 441 and a second manipulation tool 442 is a column-shaped member extending downward from the tip end portion of the base member 44 and contains therein an electrostatic charge element 460. The electrostatic charge element 460 is configured to generate static electricity. When the contact element 445 contacts (touches) the surface of the display screen of the touch panel display input device, the static electricity generated in the electrostatic charge element 460 changes the electric field in the surface of the display screen of the touch panel display input device. The touch panel display input device determines the key of the software keyboard corresponding to a region which the first manipulation tool 341 or the second manipulation tool 342 contacts (touches).

Thus, in a case where the character input device is the electrostatic capacitance touch panel display input device, the work operation for inputting the character information written in the paper document can be performed by manipulating the manipulation part of the character input device.

Embodiment 6

Hereinafter, regarding configuration and operations according to Embodiment 6, differences from Embodiment 1 will be described mainly.

Figure 17:
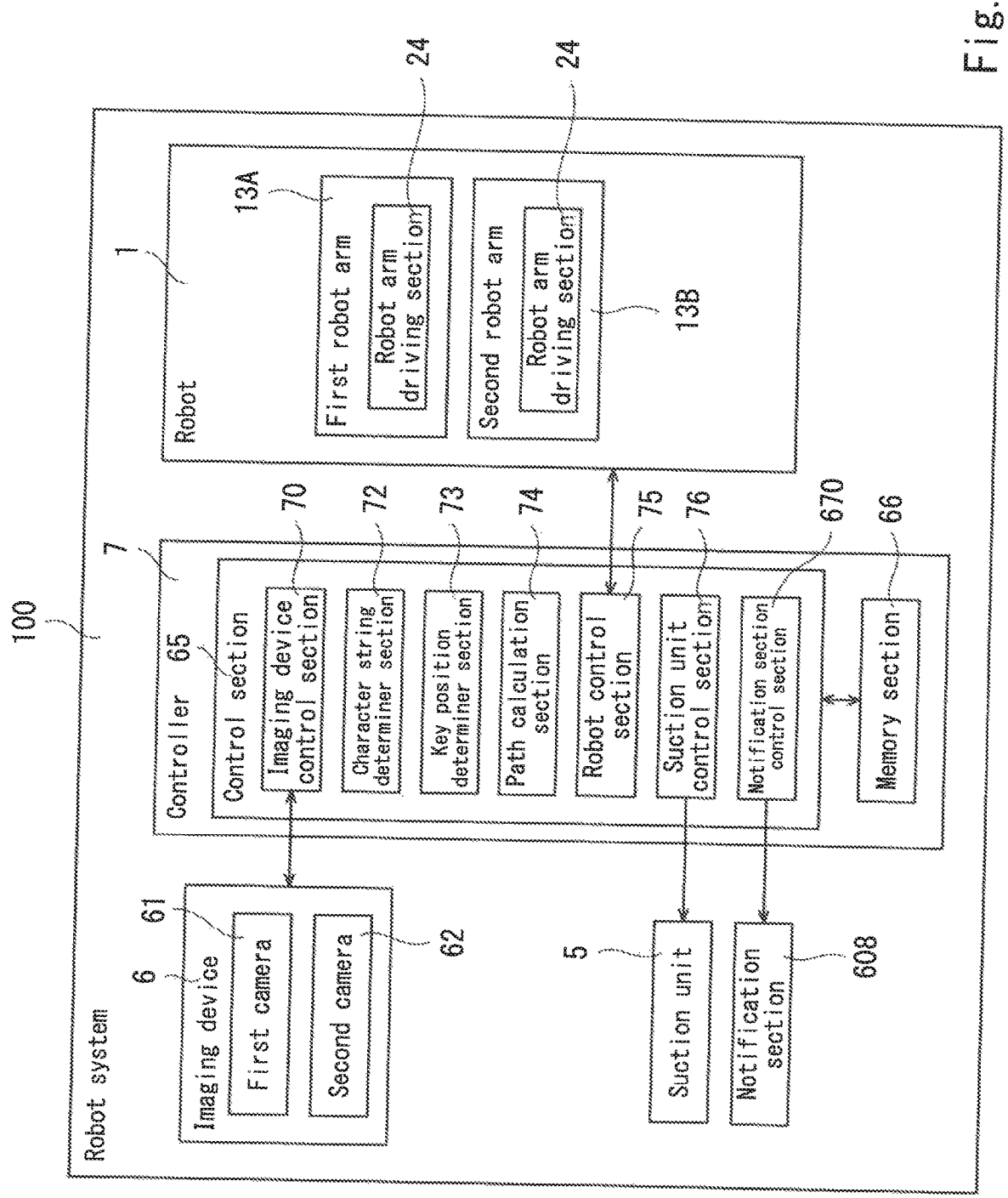
FIG. 17 is a block diagram showing an example of the configuration of a control system of a robot system according to Embodiment 6 of the present invention.

FIG. 17 is a block diagram showing an example of the configuration of the control system of the robot system according to the present embodiment.

In the present embodiment, the memory section 66 is configured to further store therein cumulative number of the number of times the work operation is performed, and the upper limit value of the number of times the work operation is performed. The cumulative number of the number of times the work operation is performed means the cumulative number of the number of times the work operation for pushing down the key 111*a* of the keyboard 111 is performed by use of the key push-down unit 4. The upper limit value of the number of times the work operation is performed is the number of times permitted as the upper limit value of the cumulative number of the number of times the work operation is performed. For example, the upper limit value of the number of times the work operation is performed is set according to the number of times of the work operation at which it is predicted that the contact element 45 which performs the push-down operation is abraded (wears out) to an extent that the contact element 45 requires to be changed. The cumulative number of the number of times the work operation is performed and the upper limit value of the number of times the work operation is performed may be stored and set, for each of the first manipulation tool 41 and the second manipulation tool 42.

As shown in FIG. 17, the robot system 100 further includes a notification section 608. The notification section 608 notifies that the cumulative number of the number of times the work operation for pushing down the key 111*a* of the keyboard 111 is performed by use of the key push-down unit 4 has exceeded a predetermined number of times. The notification section 608 is, for example, a signal lamp, and is not limited to this.

The control section 65 further includes a notification section control section 670. The notification section control section 670 is configured to determine whether or not data indicative of the cumulative number of the number of times the work operation is performed, which is stored in the memory section 66 has exceeded the upper limit value of the number of times the work operation is performed. In a case where the notification section control section 670 determines that the data indicative of the cumulative number has exceeded the upper limit value, the notification section control section 670 controls the notification section 608 to notify that the cumulative number of the number of times the work operation for pushing down the key 111*a* of the keyboard 111 is performed by use of the key push-down unit 4 has exceeded a predetermined number of times. Therefore, for example, the notification section 608 can notify the operator that the contact element 45 or the like is abraded and should be changed.

Modified Example

Although in the above-described Embodiment 1, the position information of the keys 111*a* of the keyboard 111 is pre-stored in the memory section 66, this is exemplary. Alternatively, the imaging device 6 may take an image of the upper surface of the desk 105 on which the keyboard 111 is placed, detect the position of the keyboard 111 and the position of each key 111*a* of the keyboard 111, and store them in the memory section 66.

Although in the above-described Embodiment 3 and 4, the character input device is the electromagnetic induction touch panel display input device and the electrostatic capacitance touch panel display input device, these are exemplary. The character input device may be a touch panel display input device of another type, and the first and second manipulation tools may be adapted to this type.

Although in the above-described Embodiment 1, the character string determiner section 72 determines the input target character strings, namely all of the character strings in the item columns A1 to A4 of the invoice D1, and the robot control section 75 controls the robot arm unit 13 so that the keys 111*a* corresponding to all of the characters contained in the character strings in the item columns A1 to A4 in the arrangement order of the characters, based on the determined character strings, this is exemplary.

Alternatively, for example, the character string determiner section 72 may determine the character string in an item column of a certain input target item of a plurality of input target items, and the robot control section 75 may control the robot arm unit 13 so that the keys 111*a* corresponding to the characters contained in the character string in the arrangement order of the characters, based on the determined character string. The control section 65 may be configured to repeat the above-described processing until inputting the character strings of all of the input target items are completed.

For example, the character string determiner section 72 may determine each of the characters of the input target character string, and the robot control section 75 may control the robot arm unit 13 so that the key 111*a* corresponding to the determined character is pushed down. The control section 65 may be configured to repeat the above-described processing until inputting of all of the input target character strings is completed.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

REFERENCE SIGNS LIST 1 robot
4 manipulation tool unit
6 imaging device
7 controller
13 robot arm unit
24 robot arm driving section
65 control section
66 memory section
70 imaging device control section
72 character string determiner section
73 key position determiner section
74 path calculation section
75 robot control section
100 robot system
105 deck
110 information processing device
111 keyboard
112 display device
112a display screen

The invention claimed is:

1. A robot system configured to manipulate a character input device to perform a work operation for inputting specified character information written in a paper document, the character input device being located at a predetermined position, including a plurality of manipulation parts used to input a command of the specified character information, and being configured to send the input command of the specified character information to an information processing device, the robot system comprising:
a manipulation tool unit capable of manipulating each of the plurality of manipulation parts of the character input device;
a robot including a robot arm unit which is capable of holding the manipulation tool unit and is configured to move the manipulation tool unit in a state in which the manipulation tool unit is held by the robot arm unit;
an imaging device; and
a controller including:
an imaging device control section which controls the imaging device to take an image of the paper document;
a character string determiner section which determines a character string as an input target of the paper document which is contained in image data obtained by the imaging device;
a manipulation part position determiner section which determines a position of the manipulation part corresponding to each character of the character string determined by the character string determiner section; and
a robot control section which controls the robot arm unit so that the manipulation tool unit held by the robot arm unit moves while manipulating the manipulation part determined by the character string determiner section in an arrangement order of characters of the character string, based on the position of the manipulation part corresponding to each character of the character string, which is determined by the manipulation part position determiner section.

2. The robot system according to claim 1,
wherein the controller further comprises:
a path calculation section which calculates an operation path on which the robot arm unit operates so that the manipulation tool unit held by the robot arm unit moves while manipulating the manipulation part determined by the character string determiner section in the arrangement order of the characters of the character string, based on the position of the manipulation part corresponding to each character of the character string, which is determined by the manipulation part position determiner section,
wherein the robot control section is configured to control the robot arm unit based on the operation path.

3. The robot system according to claim 2,
wherein the manipulation tool unit includes a first manipulation tool and a second manipulation tool,
wherein the robot arm unit includes a first robot arm which is capable of holding the first manipulation tool and is configured to move the first manipulation tool in a state in which the first manipulation tool is held by the first robot arm, and a second robot arm which is capable of holding the second manipulation tool and is configured to move the second manipulation tool in a state in which the second manipulation tool is held by the second robot arm, and
wherein the path calculation section calculates a first operation path on which the first robot arm operates and a second operation path on which the second robot arm operates so that the first manipulation tool held by the first robot arm and the second manipulation tool held by the second robot arm move while manipulating the manipulation part determined by the character string determiner section in the arrangement order of the characters of the character string.

4. The robot system according to claim 3, further comprising:
a suction unit including a first suction tool and a second suction tool, each of the first suction tool and the second suction tool being configured to suction an upper surface of the paper document,
wherein the controller further includes a suction unit control section which controls an operation of the suction unit for suctioning the paper document and an operation of the suction unit for releasing the paper document,
wherein the first robot arm is capable of holding the first suction tool and is configured to move the first suction tool held by the first robot arm, and
wherein the second robot arm is capable of holding the second suction tool and is configured to move the second suction tool held by the second robot arm.

5. The robot system according to claim 4,
wherein the robot control section is configured to control the first robot arm to locate the first suction tool at a first position where the first suction tool contacts an upper surface of a region which is in the vicinity of one of a pair of opposite side edges of the paper document,
wherein the suction unit control section is configured to control the suction unit to cause the first suction tool to suction the paper document,
wherein the robot control section is configured to control the second robot arm to locate the second suction tool at a second position where the second suction tool contacts an upper surface of a region which is in the vicinity of the other of the pair of opposite side edges of the paper document, wherein the suction unit control section is configured to control the suction unit to cause the second suction tool to suction the paper document, and wherein the robot control section is configured to control the second robot arm to move the second suction tool to a third position that is above the first suction tool in a normal line direction of an extending surface of the paper document, to then move the second suction tool back and forth between a fourth position that is between the second position and the third position, and the third position, and to control the first robot arm and the second robot arm to move the first suction tool and the second suction tool in a direction crossing the normal line direction of an upper surface of the paper document.

6. The robot system according to claim 1, wherein the information processing device includes a display device including a display screen which displays the character information having been input by the character input device, wherein the imaging device control section is configured to control the imaging device to take an image of the display screen, wherein the character string determiner section is configured to determine an input character string corresponding to the character string having been input by the character input device and contained in the image data of the display screen having been obtained by the imaging device, and wherein the controller further includes an input error determiner section which determines whether or not the character string as the input target contained in the image data of the paper document matches the input character string having been input by the character input device and contained in the image data of the display screen.

7. The robot system according to claim 1, wherein the character input device is a hardware keyboard, wherein the manipulation part is a key of the hardware keyboard, and wherein the robot control section is configured to control the robot arm unit so that the manipulation tool unit moves while pushing down the key.

8. The robot system according to claim 7, wherein a lower surface of the manipulation tool unit is curved to protrude in a downward direction and constitutes a contact element which contacts the key.

9. The robot system according to claim 7, wherein the manipulation tool unit includes a float mechanism including an up-down element which is movable between a lower limit position and an upper limit position and has a lower surface configured to contact the key.

10. The robot system according to claim 9, wherein the float mechanism includes an elastic element which biases the up-down element in a direction from the upper limit position toward the lower limit position.

11. The robot system according to claim 1, wherein the character input device is an electromagnetic induction touch panel display input device including a display screen which displays a software keyboard including a plurality of key images, wherein the manipulation part is a region corresponding to each of the plurality of key images, and wherein the manipulation tool unit includes a magnetic field generating element for generating a magnetic field used to identify a position at which the manipulation tool unit contacts the display screen of the character input device.

12. The robot system according to claim 1, wherein the character input device is an electrostatic capacitance touch panel display input device including a display screen which displays a software keyboard including a plurality of key images, wherein the manipulation part is a region corresponding to each of the plurality of key images, and wherein the manipulation tool unit includes an electrostatic charge element for generating static electricity used to identify a position at which the manipulation tool unit contacts the display screen of the character input device.

13. The robot system according to claim 1, further comprising:

a notification section which notifies that a cumulative number of the number of times the manipulation tool unit has manipulated the manipulation part has exceeded an upper limit value of the number of times which is permitted as an upper limit value of the cumulative number of the number of times the manipulation tool unit has manipulated the manipulation part, and wherein the controller further includes a notification section control section which determines whether or not the cumulative number has exceeded the upper limit value, and controls the notification section to notify that the cumulative number has exceeded the upper limit value, in a case where the notification section control section determines that the cumulative number has exceeded the upper limit value.

14. A method of controlling a robot system configured to manipulate a character input device to perform a work operation for inputting specified character information written in a paper document, the character input device being located at a predetermined position, including a plurality of manipulation parts used to input a command of the specified character information, and being configured to send the input command of the specified character information to an information processing device, the robot system comprising:

a manipulation tool unit capable of manipulating each of the plurality of manipulation parts of the character input device;

a robot including a robot arm unit which is capable of holding the manipulation tool unit and is configured to move the manipulation tool unit in a state in which the manipulation tool unit is held by the robot arm unit;

an imaging device; and a controller which controls the robot arm unit and the imaging device, the method comprising:

controlling by the controller the imaging device to take an image of the paper document;

determining by the controller a character string as an input target of the paper document contained in image data obtained by the imaging device;

determining by the controller a position of the manipulation part corresponding to each character of the character string determined by the character string determiner section; and controlling by the controller the robot arm unit so that the manipulation tool unit held by the robot arm unit moves while manipulating the manipulation part determined by the character string determiner section in an arrangement order of characters of the character string, based on the position of the manipulation part corresponding to each character of the character string, which is determined by the manipulation part position determiner section.

\* \* \* \* \*